US012711485B1

(12) United States Patent
Nudelman et al.

(10) Patent No.: US 12,711,485 B1
(45) Date of Patent: Aug. 18, 2026

(54) SYSTEMS AND METHODS FOR MULTI-SERVICE ACCOUNT SWITCHING

(71) Applicant: Wells Fargo Bank, N.A., San Francisco, CA (US)

(72) Inventors: Sandra Nudelman, New York, NY (US); Debashis Ghosh, San Francisco, CA (US); Mike Weinbach, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/078,825

(22) Filed: Dec. 9, 2022

(51) Int. Cl.

| | |
|---|---|
| ***G06Q 20/14*** | (2012.01) |
| ***G06Q 20/08*** | (2012.01) |
| ***G06Q 20/22*** | (2012.01) |

(52) U.S. Cl.
CPC ....... *G06Q 20/227* (2013.01); *G06Q 20/0855* (2013.01); *G06Q 20/14* (2013.01)

(58) Field of Classification Search
None
See application file for complete search history.

(56) References Cited

U.S. PATENT DOCUMENTS

| | | | |
|---|---|---|---|
| 5,412,192 | A | 5/1995 | Hoss |
| 5,778,067 | A | 7/1998 | Jones et al. |
| 5,953,710 | A | 9/1999 | Fleming |
| 6,016,484 | A | 1/2000 | Williams et al. |
| 6,353,811 | B1 | 3/2002 | Weissman |
| 6,615,194 | B1 | 9/2003 | Deutsch et al. |
| 6,865,547 | B1 | 3/2005 | Brake et al. |
| 6,873,974 | B1 | 3/2005 | Schutzer |
| 6,993,510 | B2 | 1/2006 | Guy et al. |

(Continued)

FOREIGN PATENT DOCUMENTS

| | | |
|---|---|---|
| CN | 102592239 A | 7/2012 |
| EP | 1 955 180 B1 | 7/2017 |

(Continued)

OTHER PUBLICATIONS

"Cashcloud Mobile eWallet", FinTech Forum Exchange, Jul. 1, 2016. 4 pages.

(Continued)

*Primary Examiner* — William J Jacob
(74) *Attorney, Agent, or Firm* — Foley & Lardner LLP

(57) ABSTRACT

A computer-implemented method includes: determining, by a provider computing system associated with a provider, that a transfer service token of a customer is linked to a first customer account held by another provider; transmitting, by the provider computing system, a prompt to a customer device associated with the customer, the prompt including a selectable option configured to switch the transfer service token from being linked to the first customer account to being linked to a second customer account of the provider; receiving, by the provider computing system, a selection of the selectable option from the customer device; and transmitting, by the provider computing system, a transfer service token switch request to a transfer service computing system, the transfer service token switch request initiating a switch of the transfer service token from being linked to the first customer account to being linked to the second customer account.

20 Claims, 6 Drawing Sheets

(56) References Cited

U.S. PATENT DOCUMENTS 7,086,586 B1 8/2006 Sullivan
7,287,695 B2 10/2007 Wankmueller
7,395,243 B1 7/2008 Zielke et al.
7,398,919 B2 7/2008 Cooper
7,400,883 B2 7/2008 Rivers et al.
7,631,803 B2 12/2009 Peyret et al.
7,757,944 B2 7/2010 Cline et al.
7,774,274 B2 8/2010 Jones et al.
7,822,206 B2 10/2010 Birk et al.
7,827,057 B1 11/2010 Walker et al.
7,860,790 B2 12/2010 Monk
7,909,243 B2 3/2011 Merkow et al.
7,925,285 B2 4/2011 Indirabhai
7,930,225 B2 4/2011 Wahlberg et al.
7,945,776 B1 5/2011 Atzmony et al.
7,958,049 B2 6/2011 Jamison et al.
7,970,669 B1 6/2011 Santos
8,019,365 B2 9/2011 Fisher
8,078,140 B2 12/2011 Baker et al.
8,126,806 B1 2/2012 Dimartino et al.
8,160,959 B2 4/2012 Rackley et al.
8,215,560 B2 7/2012 Granucci et al.
8,266,058 B1 * 9/2012 Anderson ............ G06Q 20/351 705/30
8,280,788 B2 10/2012 Perlman
8,401,904 B1 3/2013 Simakov et al.
8,433,657 B2 4/2013 Dinan
8,452,257 B2 5/2013 Granucci et al.
8,459,544 B2 6/2013 Casey et al.
8,467,766 B2 6/2013 Rackley et al.
8,468,587 B2 6/2013 Blinn et al.
8,489,067 B2 7/2013 Rackley, III et al.
8,504,699 B2 8/2013 Vaughan et al.
8,533,123 B2 9/2013 Hart
8,538,845 B2 9/2013 Liberty
8,548,908 B2 10/2013 Friedman
8,555,361 B2 10/2013 Nakhjiri et al.
8,566,237 B2 10/2013 Forzley
8,566,239 B2 10/2013 Arthur et al.
8,571,953 B2 10/2013 Gopalakrishnan et al.
8,589,290 B2 11/2013 Baskerville
8,615,468 B2 12/2013 Varadarajan
8,626,632 B1 1/2014 Dolan et al.
8,627,424 B1 1/2014 O'Malley et al.
8,635,131 B1 1/2014 Saunders
8,639,621 B1 1/2014 Ellis et al.
8,645,971 B2 2/2014 Carlson et al.
8,676,704 B2 3/2014 Ledbetter et al.
8,682,802 B1 3/2014 Kannanari
8,700,729 B2 4/2014 Dua
8,706,628 B2 4/2014 Phillips
8,725,576 B2 5/2014 Fisher
8,725,577 B2 5/2014 Fisher
8,732,080 B2 5/2014 Karim
8,744,966 B1 6/2014 Amacker et al.
8,750,901 B1 6/2014 Gupta et al.
8,762,265 B2 6/2014 Kessler et al.
8,762,270 B1 6/2014 Evans et al.
8,768,830 B1 7/2014 Jorgensen et al.
8,768,834 B2 7/2014 Zacarias et al.
8,774,781 B1 7/2014 Speiser et al.
8,781,955 B2 7/2014 Schamer et al.
8,831,677 B2 9/2014 Villa-Real
8,838,501 B1 9/2014 Priebatsch
8,843,125 B2 9/2014 Kwon et al.
8,843,417 B2 9/2014 Hammad
8,880,432 B2 11/2014 Collins, Jr.
8,924,246 B1 12/2014 Chen et al.
8,925,805 B2 1/2015 Grigg et al.
8,930,271 B1 1/2015 Ellis et al.
8,972,297 B2 3/2015 Kay et al.
8,977,251 B2 3/2015 Grigg et al.
8,989,712 B2 3/2015 Wentker et al.
9,020,836 B2 4/2015 Fisher et al.
9,026,460 B2 5/2015 Grigg et al.
9,027,109 B2 5/2015 Wolberg-Stok et al.
9,031,880 B2 5/2015 Bishop et al.
9,037,509 B1 5/2015 Ellis et al.
9,043,240 B2 5/2015 Langus et al.
9,043,605 B1 5/2015 Machani
9,098,190 B2 8/2015 Zhou et al.
9,111,266 B2 8/2015 Kessler et al.
9,117,242 B1 8/2015 Ellis et al.
9,177,307 B2 11/2015 Ross et al.
9,208,488 B2 12/2015 Liberty
9,208,528 B2 12/2015 Chelst et al.
9,218,624 B2 12/2015 Moghadam
9,256,876 B2 2/2016 Vasant Akole et al.
9,286,606 B2 3/2016 Diamond
9,324,068 B2 4/2016 Soundararajan
9,361,616 B2 6/2016 Zhou et al.
9,424,572 B2 8/2016 Bondesen et al.
9,473,491 B1 10/2016 Johansson et al.
9,652,770 B1 5/2017 Kurani et al.
9,659,312 B1 5/2017 Ellis et al.
9,691,058 B2 6/2017 Epler et al.
9,704,157 B1 7/2017 Ellis et al.
9,741,051 B2 8/2017 Carpenter et al.
9,785,934 B2 10/2017 Davis et al.
9,805,363 B1 10/2017 Rudnick et al.
9,818,109 B2 11/2017 Loh
9,928,518 B1 3/2018 Vippagunta et al.
9,972,047 B1 5/2018 Elliott et al.
10,019,740 B2 7/2018 Simantov et al.
10,037,561 B1 7/2018 Hecht
10,115,112 B2 10/2018 Fordyce, III
10,121,129 B2 11/2018 Kalgi
10,223,710 B2 3/2019 Purves et al.
10,235,668 B1 3/2019 Ellis et al.
10,242,368 B1 3/2019 Poole
10,380,583 B1 8/2019 Ellis et al.
10,380,596 B1 8/2019 Butler et al.
10,395,247 B2 8/2019 Gilliam et al.
10,402,897 B1 9/2019 Czyzewski et al.
10,410,190 B1 * 9/2019 Kapoor .............. G06Q 30/0185
10,445,739 B1 10/2019 Sahni et al.
10,467,615 B1 11/2019 Omojola et al.
10,515,356 B2 12/2019 Cronic et al.
10,565,558 B2 2/2020 Fredericks et al.
10,586,236 B2 3/2020 Pourfallah et al.
10,600,128 B2 3/2020 Graham et al.
10,817,950 B1 10/2020 Iqbal et al.
10,853,787 B1 12/2020 Mango
10,887,301 B1 1/2021 Vera et al.
10,997,592 B1 5/2021 Kurani
11,042,882 B2 6/2021 Ledford et al.
11,068,866 B1 7/2021 Hecht et al.
11,113,695 B2 * 9/2021 Shah ................... G06Q 20/405
11,144,902 B2 10/2021 Gaddam et al.
11,151,541 B1 * 10/2021 Jackets ............ G06Q 20/40145
11,151,546 B2 10/2021 Mossoba et al.
11,210,715 B2 12/2021 Lindsey et al.
11,227,064 B1 1/2022 Fakhraie et al.
11,228,660 B2 1/2022 Rapaka et al.
11,270,293 B2 3/2022 Salama et al.
11,288,660 B1 3/2022 Kurani
11,295,294 B1 4/2022 Kurani et al.
11,334,579 B1 5/2022 Quade et al.
11,416,766 B2 8/2022 Chao et al.
11,422,393 B2 8/2022 Stray et al.
11,436,581 B1 9/2022 Walker et al.
11,551,190 B1 1/2023 Clements et al.
11,682,005 B2 * 6/2023 Hunter .................. G06Q 20/10 705/44
2002/0032602 A1 3/2002 Lanzillo et al.
2002/0052852 A1 5/2002 Bozeman
2002/0062249 A1 5/2002 Iannacci
2002/0095386 A1 7/2002 Maritzen et al.
2002/0174016 A1 11/2002 Cuervo
2002/0198829 A1 12/2002 Ludwig et al.
2003/0028481 A1 2/2003 Flitcroft et al.
2003/0040964 A1 2/2003 Lacek
2003/0055785 A1 3/2003 Lahiri
2003/0056096 A1 3/2003 Albert et al.

(56) References Cited

U.S. PATENT DOCUMENTS

2003/0172039 A1 9/2003 Guy et al.
2004/0088349 A1 5/2004 Beck et al.
2004/0230535 A1 11/2004 Binder et al.
2004/0236632 A1 11/2004 Maritzen et al.
2004/0254848 A1 12/2004 Golan et al.
2004/0260646 A1 12/2004 Berardi et al.
2005/0021401 A1 1/2005 Postrel
2005/0021457 A1 1/2005 Johnson et al.
2005/0043997 A1 2/2005 Sahota et al.
2005/0077350 A1 4/2005 Courtion et al.
2005/0086492 A1 4/2005 Nicodemus et al.
2005/0125317 A1 6/2005 Winkelman et al.
2005/0125668 A1 6/2005 Botz
2005/0133590 A1 6/2005 Rettenmyer et al.
2005/0138377 A1 6/2005 First et al.
2005/0184145 A1 8/2005 Law et al.
2005/0235363 A1 10/2005 Hibbard et al.
2006/0129502 A1 6/2006 Pastusiak et al.
2006/0229985 A1 10/2006 Lalwani et al.
2006/0253335 A1 11/2006 Keena et al.
2007/0125840 A1 6/2007 Law
2007/0162369 A1 7/2007 Hardison
2007/0168354 A1 7/2007 Ramer et al.
2007/0170243 A1 7/2007 Desany et al.
2007/0174166 A1 7/2007 Jones
2007/0174873 A1 7/2007 Griggs
2007/0198432 A1 8/2007 Pitroda
2007/0244811 A1 10/2007 Tumminaro
2007/0250923 A1 10/2007 M'Raihi
2007/0262140 A1 11/2007 Long
2007/0295803 A1* 12/2007 Levine .................. G06Q 20/10 235/379
2008/0006685 A1 1/2008 Rackley, III et al.
2008/0033878 A1 2/2008 Krikorian et al.
2008/0127317 A1 5/2008 Nakhjiri
2008/0134295 A1* 6/2008 Bailey .................... G06F 21/30 726/4
2008/0203152 A1 8/2008 Hammad et al.
2008/0208742 A1 8/2008 Arthur et al.
2008/0242274 A1 10/2008 Swanburg et al.
2008/0294556 A1 11/2008 Anderson
2008/0319887 A1 12/2008 Pizzi et al.
2009/0027191 A1 1/2009 Farah et al.
2009/0043695 A1 2/2009 Hickey
2009/0048971 A1 2/2009 Hathaway et al.
2009/0063178 A1 3/2009 Pousti et al.
2009/0076950 A1 3/2009 Chang et al.
2009/0106558 A1 4/2009 Delgrosso et al.
2009/0157531 A1 6/2009 Bui
2009/0177563 A1 7/2009 Bernstein et al.
2009/0192873 A1 7/2009 Marble
2009/0271287 A1 10/2009 Halpern
2009/0281941 A1 11/2009 Worth
2009/0281951 A1 11/2009 Shakkarwar
2009/0319409 A1 12/2009 Omidyar
2009/0319427 A1 12/2009 Gardner et al.
2009/0327010 A1 12/2009 Vadhri
2009/0327151 A1 12/2009 Carlson et al.
2010/0057553 A1 3/2010 Ameiss et al.
2010/0063906 A1 3/2010 Nelsen et al.
2010/0076833 A1 3/2010 Nelsen
2010/0088188 A1 4/2010 Kumar et al.
2010/0114724 A1 5/2010 Ghosh et al.
2010/0114731 A1 5/2010 Kingston et al.
2010/0114733 A1 5/2010 Collas et al.
2010/0125495 A1 5/2010 Smith et al.
2010/0125510 A1 5/2010 Smith et al.
2010/0131415 A1 5/2010 Sartipi
2010/0191602 A1 7/2010 Mikkelsen et al.
2010/0205077 A1 8/2010 Hammad
2010/0274655 A1 10/2010 Postrel
2010/0280896 A1 11/2010 Postrel
2010/0325048 A1 12/2010 Carlson et al.
2010/0332386 A1 12/2010 Vancini et al.
2011/0055080 A1 3/2011 Ahlers et al.
2011/0071914 A1 3/2011 Beasley et al.
2011/0078077 A1 3/2011 Hirson
2011/0106601 A1 5/2011 Perlman et al.
2011/0106674 A1 5/2011 Perlman
2011/0137797 A1 6/2011 Stals et al.
2011/0153397 A1 6/2011 Wagenheim
2011/0191160 A1 8/2011 Blackhurst et al.
2011/0196782 A1 8/2011 Allen et al.
2011/0251892 A1 10/2011 Laracey
2011/0270665 A1 11/2011 Kim et al.
2011/0270748 A1 11/2011 Graham et al.
2011/0270749 A1 11/2011 Bennett et al.
2011/0276489 A1 11/2011 Larkin
2011/0289004 A1 11/2011 Prakash et al.
2011/0295748 A1 12/2011 Woodriffe
2011/0295749 A1 12/2011 Scalisi
2011/0313918 A1 12/2011 Lawson et al.
2011/0313921 A1* 12/2011 Dheer .................... G06Q 40/02 705/42
2011/0320344 A1* 12/2011 Faith ................. G06Q 30/0231 705/39
2012/0011063 A1 1/2012 Killian et al.
2012/0018511 A1 1/2012 Hammad
2012/0078735 A1 3/2012 Bauer et al.
2012/0078751 A1 3/2012 Macphail et al.
2012/0084210 A1 4/2012 Farahmand
2012/0110634 A1 5/2012 Jakobsson
2012/0130731 A1 5/2012 Canetto
2012/0130887 A1 5/2012 Meckling
2012/0143705 A1 6/2012 Bhattacharya et al.
2012/0150687 A1 6/2012 Hart
2012/0158589 A1 6/2012 Katzin et al.
2012/0185317 A1 7/2012 Wong
2012/0185387 A1 7/2012 Doyle
2012/0196586 A1 8/2012 Grigg et al.
2012/0197793 A1 8/2012 Grigg et al.
2012/0197794 A1 8/2012 Grigg et al.
2012/0209749 A1 8/2012 Hammad et al.
2012/0233005 A1 9/2012 White
2012/0239417 A1 9/2012 Pourfallah et al.
2012/0253852 A1 10/2012 Pourfallah et al.
2012/0253913 A1 10/2012 Richard
2012/0254021 A1 10/2012 Wohied et al.
2012/0271712 A1 10/2012 Katzin et al.
2012/0284130 A1 11/2012 Lewis et al.
2012/0284195 A1 11/2012 Mcmillen et al.
2012/0290376 A1 11/2012 Dryer et al.
2012/0296720 A1 11/2012 Pirillo
2012/0301774 A1 11/2012 Jiang et al.
2012/0303425 A1 11/2012 Katzin et al.
2012/0310774 A1 12/2012 Chassin
2012/0323717 A1 12/2012 Kirsch
2012/0323762 A1 12/2012 Kapur et al.
2012/0330837 A1 12/2012 Persaud et al.
2013/0006848 A1 1/2013 Kuttuva
2013/0013509 A1 1/2013 Perlman et al.
2013/0018777 A1 1/2013 Klein
2013/0018786 A1 1/2013 Sher
2013/0018791 A1 1/2013 Mendicino et al.
2013/0018792 A1 1/2013 Casey et al.
2013/0024364 A1 1/2013 Shrivastava et al.
2013/0030941 A1 1/2013 Meredith et al.
2013/0042261 A1 2/2013 Tavormina et al.
2013/0054336 A1 2/2013 Graylin
2013/0054454 A1 2/2013 Purves et al.
2013/0054469 A1 2/2013 Agashe et al.
2013/0060679 A1 3/2013 Oskolkov et al.
2013/0060689 A1 3/2013 Oskolkov et al.
2013/0060696 A1 3/2013 Martin et al.
2013/0060708 A1 3/2013 Oskolkov et al.
2013/0065555 A1 3/2013 Baker et al.
2013/0073365 A1 3/2013 Mccarthy
2013/0073459 A1 3/2013 Zacarias et al.
2013/0074168 A1 3/2013 Hao et al.
2013/0080241 A1 3/2013 Fisher
2013/0080323 A1 3/2013 Scipioni
2013/0110628 A1 5/2013 Yeo et al.
2013/0110658 A1 5/2013 Lyman et al.
2013/0132275 A1 5/2013 Enzaldo et al.

(56) References Cited

U.S. PATENT DOCUMENTS

2013/0132854 A1 5/2013 Raleigh et al.
2013/0144663 A1 6/2013 Qawami et al.
2013/0144702 A1 6/2013 Tabor et al.
2013/0151400 A1 6/2013 Makhotin et al.
2013/0166332 A1 6/2013 Hammad
2013/0168450 A1 7/2013 Von Mueller et al.
2013/0173456 A1 7/2013 Grigg et al.
2013/0173474 A1 7/2013 Ranganathan et al.
2013/0179336 A1 7/2013 Lyons et al.
2013/0179352 A1 7/2013 Dwyre et al.
2013/0185167 A1 7/2013 Mestre et al.
2013/0191227 A1 7/2013 Pasa et al.
2013/0191277 A1 7/2013 O'Leary et al.
2013/0191278 A1 7/2013 O'Leary et al.
2013/0200999 A1 8/2013 Spodak et al.
2013/0204785 A1 8/2013 Monk et al.
2013/0226720 A1 8/2013 Ahluwalia et al.
2013/0226751 A1 8/2013 Friedholm et al.
2013/0226799 A1 8/2013 Raj
2013/0232032 A1 9/2013 Chaturvedi et al.
2013/0238455 A1 9/2013 Laracey
2013/0246258 A1 9/2013 Dessert
2013/0246260 A1 9/2013 Barten et al.
2013/0246261 A1 9/2013 Purves et al.
2013/0246265 A1 9/2013 Al-Sahli
2013/0254028 A1 9/2013 Salci
2013/0254102 A1 9/2013 Royyuru
2013/0254114 A1 9/2013 Smith
2013/0254115 A1 9/2013 Pasa et al.
2013/0260734 A1 10/2013 Jain et al.
2013/0262309 A1 10/2013 Gadotti
2013/0262316 A1 10/2013 Hruska
2013/0262317 A1 10/2013 Collinge et al.
2013/0275250 A1 10/2013 Rodell et al.
2013/0275282 A1 10/2013 Bjones et al.
2013/0290121 A1 10/2013 Simakov et al.
2013/0290169 A1 10/2013 Bathula et al.
2013/0290176 A1 10/2013 Tirumalashetty
2013/0297425 A1 11/2013 Wallaja
2013/0297486 A1 11/2013 Colborn
2013/0297513 A1 11/2013 Kirillin et al.
2013/0304559 A1 11/2013 Stone et al.
2013/0304642 A1 11/2013 Campos
2013/0317928 A1 11/2013 Laracey
2013/0332344 A1 12/2013 Weber
2013/0346302 A1 12/2013 Purves et al.
2014/0006129 A1 1/2014 Heath
2014/0006194 A1 1/2014 Xie et al.
2014/0006276 A1 1/2014 Grigg et al.
2014/0006277 A1 1/2014 Rao
2014/0012750 A1 1/2014 Kuhn et al.
2014/0019352 A1 1/2014 Shrivastava
2014/0019360 A1 1/2014 Yang
2014/0038546 A1 2/2014 Neal et al.
2014/0040139 A1 2/2014 Brudnicki et al.
2014/0052617 A1 2/2014 Chawla et al.
2014/0058855 A1 2/2014 Hussein et al.
2014/0058936 A1 2/2014 Ren et al.
2014/0058938 A1 2/2014 Mcclung, III
2014/0067677 A1 3/2014 Ali et al.
2014/0074581 A1 3/2014 Johnson et al.
2014/0074655 A1 3/2014 Lim et al.
2014/0074724 A1 3/2014 Gordon et al.
2014/0081783 A1 3/2014 Paranjape et al.
2014/0081854 A1 3/2014 Sanchez et al.
2014/0089171 A1 3/2014 Gandhi
2014/0089195 A1 3/2014 Ward et al.
2014/0096215 A1 4/2014 Hessler
2014/0100975 A1 4/2014 Van
2014/0101034 A1 4/2014 Tanner et al.
2014/0101048 A1 4/2014 Gardiner et al.
2014/0108254 A1 4/2014 Lee
2014/0109200 A1 4/2014 Tootill et al.
2014/0114856 A1 4/2014 Jung et al.
2014/0118704 A1 5/2014 Duelli et al.
2014/0122310 A1 5/2014 Torrens et al.
2014/0122563 A1 5/2014 Singh et al.
2014/0129357 A1 5/2014 Goodwin
2014/0129433 A1 5/2014 Rosenberger
2014/0136352 A1 5/2014 Ramakrishna et al.
2014/0143089 A1 5/2014 Campos et al.
2014/0188586 A1 7/2014 Carpenter et al.
2014/0188704 A1 7/2014 Grossman et al.
2014/0188718 A1 7/2014 Grossman et al.
2014/0188719 A1 7/2014 Poornachandran et al.
2014/0201086 A1 7/2014 Gadotti et al.
2014/0207680 A1 7/2014 Rephlo
2014/0210321 A1 7/2014 Dixon
2014/0214640 A1 7/2014 Mallikarjunan et al.
2014/0222670 A1 8/2014 Concannon
2014/0236792 A1 8/2014 Pant et al.
2014/0244506 A1 8/2014 Gramling
2014/0250003 A1 9/2014 Levchin et al.
2014/0258135 A1 9/2014 Park et al.
2014/0279097 A1 9/2014 Alshobaki et al.
2014/0279459 A1 9/2014 Weiss et al.
2014/0279469 A1 9/2014 Mendes
2014/0279559 A1 9/2014 Smith et al.
2014/0279566 A1 9/2014 Verma et al.
2014/0282068 A1 9/2014 Levkovitz et al.
2014/0297435 A1 10/2014 Wong
2014/0297520 A1 10/2014 Levchin et al.
2014/0297524 A1 10/2014 Ravindranath et al.
2014/0304095 A1 10/2014 Fisher
2014/0304187 A1 10/2014 Menn
2014/0310173 A1 10/2014 Caldwell
2014/0310182 A1 10/2014 Cummins
2014/0337175 A1 11/2014 Katzin et al.
2014/0337621 A1 11/2014 Nakhimov
2014/0344153 A1 11/2014 Raj et al.
2014/0351072 A1 11/2014 Wieler et al.
2014/0351126 A1 11/2014 Priebatsch
2014/0351130 A1 11/2014 Cheek et al.
2014/0365322 A1 12/2014 Phillips
2014/0365363 A1 12/2014 Knudsen et al.
2014/0376576 A1 12/2014 Jespersen et al.
2014/0379576 A1 12/2014 Marx et al.
2015/0019944 A1 1/2015 Kalgi
2015/0026049 A1 1/2015 Theurer et al.
2015/0032626 A1 1/2015 Dill et al.
2015/0032627 A1 1/2015 Dill et al.
2015/0046339 A1 2/2015 Wong et al.
2015/0066790 A1 3/2015 Desanti
2015/0074774 A1 3/2015 Nema et al.
2015/0088633 A1 3/2015 Salmon et al.
2015/0089568 A1 3/2015 Sprague et al.
2015/0095075 A1 4/2015 Breuer et al.
2015/0100442 A1 4/2015 Van Heerden et al.
2015/0100495 A1 4/2015 Salama et al.
2015/0112781 A1 4/2015 Clark et al.
2015/0120472 A1 4/2015 Aabye et al.
2015/0121063 A1 4/2015 Maller et al.
2015/0134514 A1 5/2015 Chan et al.
2015/0134540 A1 5/2015 Law et al.
2015/0137938 A1 5/2015 Slaby et al.
2015/0140960 A1 5/2015 Powell et al.
2015/0154588 A1 6/2015 Purves et al.
2015/0178693 A1 6/2015 Solis
2015/0186855 A1 7/2015 Bennett et al.
2015/0186872 A1 7/2015 Sobol et al.
2015/0186875 A1 7/2015 Zhang et al.
2015/0186886 A1 7/2015 Schwalb et al.
2015/0186952 A1 7/2015 Brown et al.
2015/0187021 A1 7/2015 Moring et al.
2015/0193131 A1 7/2015 Bayer et al.
2015/0193745 A1 7/2015 Handwerger et al.
2015/0193869 A1 7/2015 Del Vecchio et al.
2015/0213435 A1 7/2015 Douglas et al.
2015/0220914 A1 8/2015 Purves et al.
2015/0229622 A1 8/2015 Grigg et al.
2015/0237026 A1 8/2015 Kumar
2015/0242987 A1 8/2015 Lee et al.
2015/0254647 A1* 9/2015 Bondesen ............ G06Q 20/385
705/41

(56) References Cited

U.S. PATENT DOCUMENTS

2015/0254660 A1 9/2015 Allison et al.
2015/0254668 A1 9/2015 Guiney et al.
2015/0254698 A1 9/2015 Bondesen et al.
2015/0254699 A1 9/2015 Bondesen et al.
2015/0278799 A1 10/2015 Palanisamy
2015/0278816 A1 10/2015 Fleishman et al.
2015/0287015 A1 10/2015 Kaplinger et al.
2015/0287037 A1 10/2015 Salmon et al.
2015/0324768 A1 11/2015 Filter et al.
2015/0332252 A1 11/2015 Shahrokhi et al.
2015/0333964 A1 11/2015 Wang et al.
2015/0339662 A1 11/2015 Huang et al.
2015/0339663 A1 11/2015 Lopreiato et al.
2015/0339671 A1 11/2015 Krietzman et al.
2015/0348029 A1 12/2015 Van Os et al.
2015/0363810 A1 12/2015 Kim et al.
2015/0371212 A1 12/2015 Giordano et al.
2015/0371234 A1 12/2015 Huang et al.
2015/0371326 A1 12/2015 Montesano et al.
2016/0004876 A1 1/2016 Bye et al.
2016/0012465 A1 1/2016 Sharp
2016/0026999 A1 1/2016 Kurian
2016/0042341 A1 2/2016 Griffin et al.
2016/0042344 A1 2/2016 Thimmana et al.
2016/0048828 A1 2/2016 Lee
2016/0048929 A1 2/2016 Parento et al.
2016/0054336 A1 2/2016 Anderberg et al.
2016/0063496 A1 3/2016 Royyuru et al.
2016/0065370 A1 3/2016 Le Saint et al.
2016/0071071 A1 3/2016 Lazay
2016/0071074 A1 3/2016 Baird
2016/0071096 A1 3/2016 Rosca
2016/0071097 A1 3/2016 Lazay
2016/0071099 A1 3/2016 Lazay
2016/0071109 A1 3/2016 Lazay
2016/0071110 A1 3/2016 Lazay
2016/0086170 A1 3/2016 Hurt et al.
2016/0086179 A1 3/2016 Barbier
2016/0092696 A1 3/2016 Guglani et al.
2016/0092866 A1 3/2016 Liberty et al.
2016/0092868 A1 3/2016 Salama et al.
2016/0092874 A1 3/2016 O'Regan et al.
2016/0125396 A1 5/2016 Brickell et al.
2016/0125409 A1 5/2016 Meredith et al.
2016/0125417 A1 5/2016 Huang et al.
2016/0132875 A1 5/2016 Blanco et al.
2016/0132884 A1 5/2016 Fridman et al.
2016/0140555 A1 5/2016 Scipioni
2016/0140561 A1 5/2016 Cowan
2016/0162882 A1 6/2016 Mcclung, III
2016/0162889 A1 6/2016 Badenhorst
2016/0180305 A1 6/2016 Dresser et al.
2016/0269416 A1 9/2016 Camenisch et al.
2016/0283925 A1 9/2016 Lavu et al.
2016/0342962 A1 11/2016 Brown et al.
2016/0342992 A1 11/2016 Lee
2016/0343043 A1 11/2016 Hicks et al.
2016/0379215 A1 12/2016 Clerkin
2017/0017958 A1 1/2017 Scott et al.
2017/0061402 A1 3/2017 Mobin et al.
2017/0061406 A1 3/2017 Adams et al.
2017/0061438 A1 3/2017 Patel
2017/0091758 A1* 3/2017 Kim .................... G06Q 20/227
2017/0164139 A1 6/2017 Deselaers et al.
2017/0178110 A1 6/2017 Swanson et al.
2017/0185989 A1 6/2017 Bozovich, Jr.
2017/0193468 A1 7/2017 Chougule et al.
2017/0228715 A1 8/2017 Gurunathan
2017/0236118 A1 8/2017 Laracey
2017/0337542 A1 11/2017 Kim et al.
2017/0357969 A1 12/2017 Huang et al.
2017/0357977 A1 12/2017 Pitz et al.
2017/0364914 A1 12/2017 Howard
2018/0007052 A1 1/2018 Quentin
2018/0012203 A1 1/2018 Hall
2018/0032981 A1 2/2018 Shanmugam et al.
2018/0068308 A1 3/2018 Gupta et al.
2018/0082283 A1 3/2018 Sharma
2018/0096428 A1 4/2018 Gorenstein
2018/0150811 A1 5/2018 Smith et al.
2018/0157336 A1 6/2018 Harris et al.
2018/0158116 A1 6/2018 Hoang et al.
2018/0219863 A1 8/2018 Tran
2018/0285836 A1 10/2018 Enobakhare
2018/0322488 A1 11/2018 Arana et al.
2018/0324204 A1 11/2018 Mcclory et al.
2018/0365675 A1 12/2018 Sivaraman
2018/0374076 A1 12/2018 Wheeler
2019/0108505 A1 4/2019 Perlman
2019/0122222 A1 4/2019 Uechi
2019/0165942 A1 5/2019 Subramaniam
2019/0220908 A1 7/2019 Wilkes
2019/0236577 A1 8/2019 Schmid et al.
2019/0280863 A1 9/2019 Meyer et al.
2019/0303803 A1 10/2019 Buc et al.
2019/0304029 A1 10/2019 Murray et al.
2019/0378182 A1 12/2019 Weinflash et al.
2019/0385250 A1 12/2019 Bhattacharjee et al.
2020/0005277 A1 1/2020 Prabhu et al.
2020/0028753 A1 1/2020 Powar et al.
2020/0034813 A1 1/2020 Calinog et al.
2020/0051117 A1 2/2020 Mitchell
2020/0076813 A1* 3/2020 Felice-Steele .......... H04L 63/18
2020/0097957 A1 3/2020 Driggs et al.
2020/0151706 A1 5/2020 Mossoba et al.
2020/0175496 A1 6/2020 Finke et al.
2020/0193405 A1* 6/2020 Bedier ................. G06Q 20/204
2020/0219060 A1 7/2020 Fredericks et al.
2020/0279305 A1 9/2020 Mossoba et al.
2020/0372536 A1 11/2020 Scislowski et al.
2021/0019718 A1 1/2021 Moskowitz et al.
2021/0027291 A1 1/2021 Ranganathan
2021/0056552 A1 2/2021 Murray
2021/0110392 A1 4/2021 Lacoss-Arnold et al.
2021/0158333 A1 5/2021 Cohen et al.
2021/0166260 A1 6/2021 Ho et al.
2021/0358754 A1 11/2021 Masuoka et al.
2021/0398179 A1 12/2021 Kolaja et al.
2022/0027873 A1 1/2022 Pathuri et al.
2022/0101609 A1 3/2022 Hu et al.
2022/0147967 A1 5/2022 Clark
2022/0210209 A1 6/2022 Vanbuskirk et al.
2022/0215356 A1 7/2022 Dakshinyam et al.
2022/0261774 A1* 8/2022 Malhotra ............... G06Q 20/10
2022/0284505 A1 9/2022 Schaefer et al.
2022/0343380 A1 10/2022 Abhyankar et al.
2022/0398622 A1* 12/2022 Cooper .............. G06Q 30/0239
2023/0056173 A1 2/2023 Jones et al.
2023/0067507 A1 3/2023 Seton et al.

FOREIGN PATENT DOCUMENTS

JP 2002-312554 A 10/2002
KR 20090014076 A 2/2009
WO WO-01/41020 A1 6/2001
WO WO-2011/100529 A1 8/2011
WO WO-2011/113121 A1 9/2011
WO WO-2011/159842 A2 12/2011
WO WO-2012/139003 A2 10/2012
WO WO-2013/044175 A1 3/2013
WO WO-2013/079793 A1 6/2013
WO WO-2014/111888 A1 7/2014
WO WO-2014/134180 A2 9/2014
WO WO-2014/207615 A1 12/2014
WO WO-2014/210321 A2 12/2014
WO WO-2015/023172 A2 2/2015
WO WO-2015/054697 A1 4/2015
WO WO-2016/009198 A1 1/2016
WO WO-2016/053975 A1 4/2016
WO WO-2016/097879 A1 6/2016
WO WO-2016/153977 A1 9/2016
WO WO-2016/172107 A1 10/2016
WO WO-2016/196054 A1 12/2016

(56) References Cited

FOREIGN PATENT DOCUMENTS

| | | | |
|---|---|---|---|
| WO | WO-2017/106309 | A1 | 6/2017 |
| WO | WO-2018/005798 | A1 | 1/2018 |
| WO | WO-2021/142356 | A1 | 7/2021 |

OTHER PUBLICATIONS

"Cashcloud mobile eWallet", Popote Payments, www.popotepayments.com, 2016. 6 pages.
"Messages in the SCT interbank space—pacs.008 and pacs.002", Nov. 1, 2017, Paiementor, pp. 1-3 (Year: 2017).
A Smart Card Alliance Payments Council White Paper; Publication date: Sep. 2011; Publication No. PC-11002; 191 Clarksville Rd. Princeton Junction, NJ 08550 www.smartcardalliance.org (Year: 2011).
Alipay, Alipay Documentation Red Packet QR Code Introduction, printed on Sep. 30, 2019 at Internet address https://intl.alipay.com/doc/redpacket/scrzsv, 2 pages.
Alipay, Trust Makes It Simple, printed on Sep. 30, 2019 from Internet address https://intl.alipay.com/, 3 pages.
Authors et al.: Disclosed anonymously, Notifying a User When a Bill is Due Using a Notification on the User's Mobile Device, Oct. 18, 2013 IP.com PAD, entire document (Year: 2013).
Bravo, Bravo Pay, CrunchBase, printed on Sep. 30, 2019 from Internet address https://www.crunchbase.com/organization/bravo#section-overview, 9 pages.
Bravo, Tip or Pay Your Tour Guide Without Sharing Personal Info, printed on Sep. 30, 2019 from Internet address https://trybravo.com, 4 pages.
Bravo, Trybravo's Competitors, Revenue, Number of Employees, Funding and Acquisitions, printed from Internet address https://www.owler.com/company/trybravo on Sep. 30, 2019, 2 pages.
DipJar, printed on Sep. 30, 2019 from Internet address https://www.dipjar.com/, 10 pages.
EMV, "Payment Tokenisation Specification Technical Framework", 2014 EMVCO, LLC. 84 pages.
How to Control Children's Spending on Debit Cards | Money | by Jill Paperworth, May 10, 2009, https:www.theguardian.com/money/2009/mar/ . . . /children-debit-cards-online-spend . . . (Year: 2009).
Lehdonvirta et al., UbiPay: Minimizing Transaction Costs with Smart Mobile Payments, Proceedings of the 6th International Conference on Mobile Technology, Application & Systems, ACM, Jan. 2009, retrieved from the Internet at http://www.researchgate.net/profile/Tatsuo_Nakajima/publication/220982951_UbiPay_minimizing_transaction_costs_with_smart_mobile_payments/links/548e9dad0cf225bf66a607bb.pdf on Oct. 30, 2015, 8 pages.
LevelUp, Restaurant Customers Expect Seamless Digital Experiences, printed on Sep. 30, 2019 from Internet address https://www.thelevelup.com/, 4 pages.
Message in the SCT interbank space—pacs.008 and pacs.002, Nov. 1, 2017, Paiementor, pp. 1-3 (Year: 2017).
N. C. Kiran and G. N. Kumar, "Reliable OSPM schema for secure transaction using mobile agent in micropayment system," 2013 Fourth International Conference on Computing, Communications and Networking Technologies (ICCCNT), 2013, pp. 1-6, doi: 10.1109/ICCCNT.2013,6726503. (Year: 2013).
P. De, K. Dey, V. Mankar and S. Mukherjea, "Towards an interoperable mobile wallet service," 2013 10th International Conference and Expo on Emerging Technologies for a Smarter World (CEWIT), 2013, pp. 1-6, doi: 1109/CEWIT.2013.6713767. (Year: 2013).
Smart Card Alliance, "The Mobile Payments and NFC Landscape: A U.S. Perspective," Sep. 2011. 53 pages.
Square, Inc., Grow Your Business Your Way With Square Tools, printed on Sep. 30, 2019 from Internet address https://squareup.com/us/en, 8 pages.
TSIP, Introducing Helping Heart—A Contactless Payment Jacket to Help the Homeless, dated Jul. 4, 2017, printed on Sep. 30, 2019 from Internet address https://www.tsip.co.uk/blog/2019/2/19/introducing-helping-heart-a-contactless-payment-jacket-to-help-the-homeless, 4 pages.
Uber, How Uber Works, printed on Sep. 30, 2019 from Internet address https://www.uber.com/us/en/about/how-does-uber-work/, 6 pages.
W. Adi, A. Al-Qayedi, A. A. Zarooni and A. Mabrouk, "Secured multi-identity mobile infrastructure and offline mobile-assisted micro-payment application," 2004 IEEE Wireless Communications and Networking Conference (IEEE Cat. No. 04TH8733), 2004, pp. 879-882 vol. 2, doi: 10.1109/WCNC.2004.1311302. (Year: 2004).
Wazeopedia, Main Page, printed on Sep. 30, 2019 from Internet address https://wazeopedia.waze.com/wiki/USA/Main_Page, 3 pages.
White, Ron, "How Computers Work", Que Publishing, 7th Ed, Oct. 15, 2003, p. 4. 23 pages.
Yang, Ming-Hour. "Security enhanced EMV-based mobile payment protocol." TheScientificWorldJournal vol. 2014 (2014): 864571. Doi: 10.115/2014/864571 (Year: 2014).
1. Authors: Saygin Baksi et al; Title: Optimal primary-secondary user pairing and power allocation in cognitive cooperative multiple access channels; Date Added to IEEE Xplore: Apr. 10, 2014 (Year: 2014).
2. Authors et al: Tianliang Lei ; Title: Investigation of Cross-Social Network User Identification; Date of Conference: Apr. 21-22, 2022 . (Year: 2022).
P2P-Paid: A Peer-to-Peer Wireless Payment System by Gao et al (Year: 2005).
Polito et al., Inter-provider AAA and Billing of VoIP Users with Token-based Method, Dec. 26, 2007, IEEE Xplore, entire document (Year: 2007).
"Wang et al. Mobile payment security, threats, and challenges, Mar. 24, 2016, IEEE Xplore, Entire document" (Year: 2016).
Authors et al: Tianliang Lei ; Title: Investigation of Cross-Social Network User Identification; Date of Conference: Apr. 21-22, 2022. (Year: 2022).
Authors: Saygin Baksi et al; Title: Optimal primary-secondary user pairing and power allocation in cognitive cooperative multiple access channels; Date Added to IEEE Xplore: Apr. 10, 2014 (Year: 2014).
Hany Herb, Hassan Farahat, and Mohamed Ezz, SecureSMSPay: Secure SMS Mobile Payment Model, 2008, 2008 2nd International Conference on Anti-counterfeiting, Security and Identification (pp. 11-17) (Year:2008).
J. Gao, V. Kulkarni, H. Ranavat, L. Chang and H. Mei, "A 2D Barcode-Based Mobile Payment System," 2009 Third International Conference on Multimedia and Ubiquitous Engineering, 2009, pp. 320-329, doi: 10.1109/MU E.2009.62. (Year: 2009).
Latterell, Kayla, "How Do Gift Cards Work?," https://www.cardsource.com/news/how-do-gift-cards-work, pp. 1-6.
"Authors et al., Secure Authorization Token, Sep. 18, 2013, IP.com PAD, entire document" (Year: 2013).
Paiementor., "Messages in the SCT interbank space—pacs.008 and pacs.002," Nov. 1, 2017, Paiementor, pp. 1-3 (Year 2017).
Kyrillidis; Mayes; Markantonakis, Card-present Transactions on the Internet Using the Smart CardWeb Server, 2013, IEEE, 12th, p. 616 (Year: 2013).
Urien, P., et al., "A breakthrough for prepaid payment: End to end token exchange and management using secure SSL channels created by EAP-TLS smart cards", 2011 International Conference on Collaboration Technologies and Systems (CTS), 2011. (Year: 2011).
Ogundele, O., et al., "The Implementation of a Full EMV Smartcard for a Point-of-Sale Transaction and Its Impact on the PCI DSS", 2012 International Conference on Privacy, Security, Risk and Trust and 2012 International Conference on Social Computing (2012, pp. 797-806). (Year: 2012).
Stapleton, "PAN Encryption: The next evolutionary step?" ISSA Journal, Jun. 2009 (Year: 2009).
Anderson et al., "On the Reliability of Electronic Payment Systems," IEEE Transactions on Software Engineering, vol. 22 No. 5 1996 (Year: 1996).
Ledford et al., "Request for payment: Building block for payments transformations," 2016, Journal of Payments Strategy and Systems, vol. 10, No. 3.

(56) References Cited

OTHER PUBLICATIONS

Stipe, "Payment Tokenization: What it is and how it works," 2025, 13 pages.

* cited by examiner

202
Receive Customer Request
200

204
Registered for Transfer Service?
No
Yes
206
Linked to External Account?
No
Yes
210
Prompt Customer to Switch Account Information
212
Customer Accepts?
No
Yes
208
214
Switch Account Information
Perform Requested Action

SYSTEMS AND METHODS FOR MULTI-SERVICE ACCOUNT SWITCHING

TECHNICAL FIELD

Aspects and embodiments of the present disclosure relate to systems and methods for automatically switching customer accounts linked to or otherwise associated with various services.

BACKGROUND

Customers use a variety of services that push, pull, transfer, and/or otherwise utilize resources of customer financial accounts. In some instances, a customer may utilize only one or a few customer financial accounts across a variety of different services. Traditionally, switching customer financial accounts linked to or otherwise associated with a variety of different services has been cumbersome. This is taxing on the customer and the computer system associated with the new customer account. In this way, the new system must establish links or connections to various potential third parties in as seamless manner as possible, else continued resources may be required to continuously prompt the customer for various information. It would be advantageous to provide an improved system and method for switching customer accounts.

SUMMARY

One embodiment relates to a computer-implemented method. The computer-implemented method comprises determining, by a provider computing system associated with a provider, that a transfer service token of a customer is linked to a first customer account held by another provider. The computer-implemented method further comprises, in response to determining that the transfer service token is linked to the first customer account, transmitting, by the provider computing system, a prompt to a customer device associated with the customer, the prompt including a selectable option configured to switch the transfer service token from being linked to the first customer account to being linked to a second customer account of the provider. The computer-implemented method further comprises receiving, by the provider computing system, a selection of the selectable option from the customer device. The computer-implemented method further comprises, in response to receiving the selection of the selectable option, transmitting, by the provider computing system, a transfer service token switch request to a transfer service computing system, the transfer service token switch request initiating a switch of the transfer service token from being linked to the first customer account to being linked to the second customer account.

Another embodiment relates to a provider computing system associated with a provider. The provider computing system comprises one or more processing circuits including one or more processors coupled to one or more memory devices, the one or more memory devices having instructions stored thereon that, when executed by the one or more processors, cause the one or more processors to determine that a transfer service token of a customer is linked to a first customer account held by another provider. The instructions, when executed by the one or more processors, further cause the one or more processors to, in response to determining that the transfer service token is linked to the first customer account, transmit a prompt to a customer device of the customer, the prompt including a selectable option configured to switch the transfer service token from being linked to the first customer account to being linked to a second customer account held by the provider. The instructions, when executed by the one or more processors, further cause the one or more processors to receive a selection of the selectable option from the customer device. The instructions, when executed by the one or more processors, further cause the one or more processors to, in response to receiving the selection of the selectable option, transmit a transfer service token switch request to a transfer service computing system, the transfer service token switch request initiating a switch of the transfer service token from being linked to the first customer account to being linked to the second customer account.

Still another embodiment relates to a non-transitory computer-readable medium having instructions stored thereon that, when executed by at least one processing circuit of a provider computing system associated with a provider, cause operations including determining that a transfer service token of a customer is linked to a first customer account held by another provider. The operations further include, in response to determining that the transfer service token is linked to the first customer account, transmitting a prompt to a customer device of the customer, the prompt including a selectable option configured to switch the transfer service token from being linked to the first customer account to being linked to a second customer account held by the provider. The operations further include receiving a selection of the selectable option from the customer device. The operations further include, in response to receiving the selection of the selectable option, transmitting a transfer service token switch request to a transfer service computing system, the transfer service token switch request initiating a switch of the transfer service token from being linked to the first customer account to being linked to the second customer account.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Figure 1:
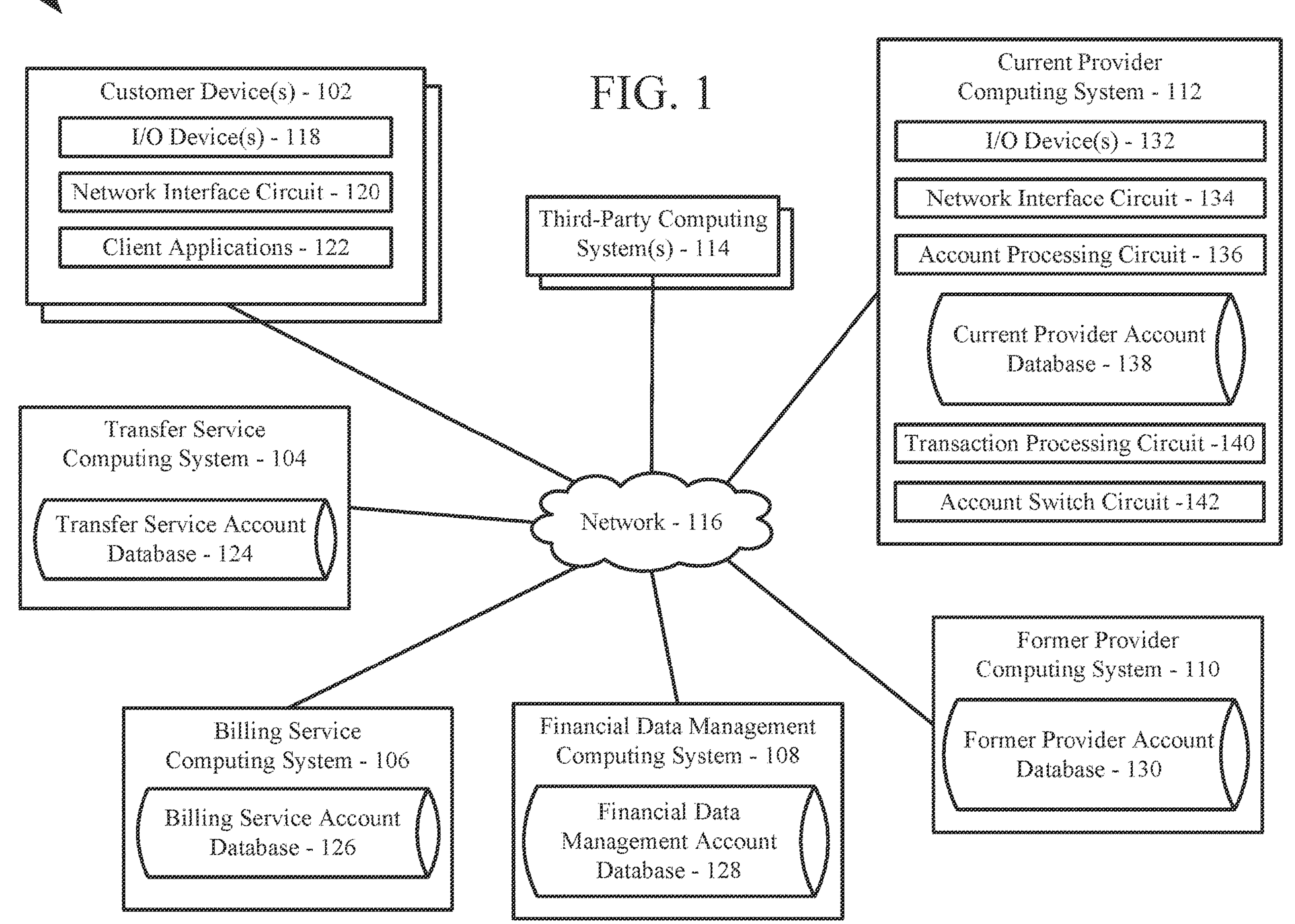
FIG. 1 is a block diagram of a computing environment that allows for multi-service account switching, according to an example embodiment.

Referring generally to the figures, systems and methods for performing multi-service account switching are disclosed according to various embodiments herein. In some instances, the systems and methods described herein allow for various transfer service tokens, billing service account information, and third-party billing accounts originally linked to or otherwise associated with an external former account (e.g., financial account) held by an external provider institution to be conveniently switched to instead be linked to or otherwise associated with a current financial account held by a current provider institution. Beneficially, the systems and methods described herein allow for each of the transfer service tokens, billing service account information, and third-party billing accounts of the customer to be switched to the current financial account within a single process, thereby ensuring that future transfers and bill payments are not unexpectedly drawn or pushed from the external financial account.

By ensuring that the future transfers and bill payments are not unexpectedly drawn or pushed from the external financial account, the systems and methods described herein effectively reduce the likelihood and frequency of inadvertent overdrafts occurring on the external financial account, and thereby eliminate a variety of computational burdens associated with customer overdrafts. For example, in some instances, customers who have over-drafted a given account may need to complete a separate transaction to restore the over-drafted account to a positive balance. Further, by reducing an overall frequency of inadvertent overdrafts, the systems and methods described herein may additionally reduce a number overdraft-related complaints and other communications received from customer devices, thereby further reducing an overall computational burden placed on the system.

As used herein, in the context of a transfer service token, the term "linked" is utilized to signify that an association between the transfer service token and a given financial account of the customer has been created and stored within a transfer service account of the customer within a transfer service account database of the transfer service. As such, when the transfer service token is used to initiate a transfer, the transfer service will use the "linked" financial account to push or receive funds or other resources to or from a corresponding recipient or sender.

Similarly, in the context of a billing service account, the term "linked" is utilized to signify that an association between the billing service account and a given financial account of the customer has been created and stored within a billing service account of the customer within a billing service account database of the billing service (or elsewhere). As such, when the billing service is used to initiate automatic bill payments to various third-party billing accounts on behalf of the customer, the funds or other resources are pushed from the "linked" financial account to the third-party billing accounts.

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

FIG. 1 is a diagram of a computing environment 100 that allows for multi-service account switching associated with a variety of customer financial activities. As shown, the computing environment 100 includes one or more customer devices 102, a transfer service computing system 104, a billing service computing system 106, a financial data management computing system 108, a former provider computing system 110, a current provider computing system 112, and one or more third-party computing systems 114. The one or more customer devices 102, the transfer service computing system 104, the billing service computing system 106, the financial data management computing system 108, the former provider computing system 110, the current provider computing system 112, and the one or more third-party computing systems 114 are in communication with each other and are connected by a network 116.

Although various systems and/or devices are shown in FIG. 1 as being singular (e.g., the transfer service computing system 104) or plural (e.g., customer devices 102), it will be understood that, in some instances, the computing environment 100 may include one or multiple of any of the various illustrated systems and/or devices, as desired for a given application. Further, while the following descriptions of the various systems and devices are largely provided in terms of single systems or devices, it will be appreciated that these descriptions are similarly applicable to any additional corresponding systems and/or devices (e.g., additional customer devices 102, additional transfer service computing systems 104, and so on).

The customer device 102 is owned, operated, controlled, managed, and/or otherwise associated with a customer (e.g., a customer of a current provider institution associated with the current provider computing system 112). In some embodiments, the customer device 102 may be or may comprise, for example, a desktop or laptop computer (e.g. a tablet computer), a smartphone, a wearable device (e.g., a smartwatch), a personal digital assistant, and/or any other suitable computing device. In the example shown in FIGS. 4-6, the customer device 102 is structured as a mobile computing device, namely a smartphone.

In some embodiments, the customer device 102 includes one or more I/O devices 118, a network interface circuit 120, and one or more client applications 122. While the term "I/O" is used, it should be understood that the I/O devices 118 may be input-only devices, output-only devices, and/or a combination of input and output devices. In some instances, the I/O devices 118 include various devices that provide perceptible outputs (such as display devices with display screens and/or light sources for visually-perceptible elements, an audio speaker for audible elements, and haptics or vibration devices for perceptible signaling via touch, etc.), that capture ambient sights and sounds (such as digital cameras, microphones, etc.), and/or that allow the customer to provide inputs (such as a touchscreen display, stylus, keyboard, force sensor for sensing pressure on a display screen, etc.). In some instances, the I/O devices 118 further comprise one or more user interfaces (devices or components that interface with the customer), which may include one or more biometric sensors (such as a fingerprint reader, a heart monitor that detects cardiovascular signals, face scanner, an iris scanner, etc.).

The network interface circuit 120 includes, for example, program logic and various devices (e.g., transceivers, etc.) that connect the customer device 102 to the network 116. The network interface circuit 120 facilitates secure communications between the customer device 102 and each of the transfer service computing system 104, the billing service computing system 106, the financial data management computing system 108, the former provider computing system 110, the current provider computing system 112, and the one or more third-party computing systems 114. The network interface circuit 120 also facilitates communication with other entities, such as other banks, settlement systems, and so on.

The customer device 102 stores in computer memory, and executes ("runs") using one or more processors, various customer client applications 122, such as an Internet browser presenting websites, text messaging applications, and/or applications provided or authorized by entities implementing or administering any of the computing systems in computing environment 100.

For example, in some instances, the customer client applications 122 comprise a customer provider client application (e.g., a financial institution banking application) provided by and at least partly supported by the current provider computing system 112. For example, in some instances, the customer client application 122 coupled to the current provider computing system 112 may enable the customer to perform various customer activities (e.g., account management, account opening and/or closing actions, account withdrawals and deposits) and/or perform various transactions (e.g., the customer making a mortgage payment, the customer sending funds to a recipient, the customer receiving funds from a sender, etc.) associated with one or more customer financial accounts of the customer held at a current provider institution associated with the current provider computing system 112.

In some other instances, the customer client application 122 provided by the current provider computing system 112 may additionally be coupled to the transfer service computing system 104 and/or the billing service computing system 106 (e.g., via one or more application programming interfaces (APIs) and/or software development kits (SDKs)) to integrate one or more features or services provided by the transfer service computing system 104 and/or the billing service computing system 106.

For example, in some instances, the current provider computing system 112 may integrate a transfer service provided by the transfer service computing system 104 for transferring funds between users of the transfer service, as will be described further below, into the customer client application 122. In some other instances, the transfer service computing system 104 may additionally or alternatively provide the transfer service via a separate customer client application 122.

In some instances, the current provider computing system 112 may additionally or alternatively integrate a billing service provided by the billing service computing system 106 for setting up and performing various automatic bill payments from customer financial accounts to various third-party service providers, as will be described further below, into the customer client application 122. In some other instances, the billing service computing system 106 may similarly additionally or alternatively provide the billing service via a separate customer client application 122.

In some instances, the current provider computing system 112 may additionally or alternatively integrate a financial data management service provided by the financial data management computing system 108 for enabling the secure sharing of various customer financial data between various systems, devices, and applications, as will be described further below, into the customer client application 122. In some other instances, the financial data management computing system 108 may similarly additionally or alternatively provide the financial data management service via a separate customer client application 122.

The transfer service computing system 104 is controlled by, managed by, owned by, and/or otherwise associated with a transfer service entity (e.g., Zelle®, Billpay, online wire transfer services) that is configured to enable real-time or nearly real-time transfers between users and/or businesses. As described herein and in one embodiment, the "transfer" is a payment or fund transfer. In some instances, the payment or fund transfer may include electronic or digital fund transfers. In some other instances, the "transfer" may be a transfer of one or more additional or alternative resources (e.g., documents or other data types, certain types of information, etc.).

In some instances, the transfer service entity may be a financial institution (e.g., a card network) or other entity that supports transfers across multiple different entities (e.g., across different financial institutions). In some instances, the transfer service entity may, for example, be an entity that is formed as a joint venture between banks and/or other entities that send and receive funds using the computing environment 100. As another example, the transfer service entity may be a third party vendor. As still another example, the transfer service entity may be provided by one of the current provider institution or the former provider institution, such that the provider institution performs both the operations described herein as being performed by the current provider computing systems 112 or the former provider computing system 110 and the operations described herein as being performed by the transfer service computing system 104.

In some embodiments, transfer service computing system 104 may, for example, comprise one or more servers, each with one or more processing circuits including one or more processors configured to execute instructions stored in one or more memory devices, send and receive data stored in the one or more memory devices, and perform other operations to implement the operations described herein associated with certain logic and/or processes depicted in the figures.

Although not specifically shown, it will be appreciated that the transfer service computing system 104 may include a network interface circuit, various additional databases (e.g., similar to the transfer service account database 124), an account processing circuit (e.g., similar to the account processing circuit 136 of the current provider computing system 112), and other circuits in the same or similar manner to the other components of computing environment 100. In some instances, the network interface circuit may include user interface program logic configured to generate and present application pages, web pages, and/or various other data to users accessing the transfer service computing system 104 over the network 116.

The transfer service computing system 104 is configured to enable real-time or nearly real-time transfers between registered users of the transfer service. For example, in some instances, the transfer service computing system 104 is configured to receive a registration request from the customer device 102, the former provider computing system 110, and/or the current provider computing system 112 to register the customer. In some instances, the registration request includes a desired transfer service token (e.g., a Zelle® identifier), account information associated with a customer financial account, and identifying information associated with the customer. In some instances, the desired transfer service token is a phone number, an e-mail address, an alphanumeric tag, etc., that the customer wishes to have associated or linked to the customer financial account. In some instances, the account information may include a bank routing number and a bank account number of the customer financial account. In some instances, the identifying information may be a customer name, a customer phone number, a customer e-mail address, a physical address, etc. Upon receiving the registration request, the transfer service computing system 104 is configured to store the desired transfer service token, the account information, and the identifying information for the customer within the transfer service account database 124 and to link the transfer service token to the account information and the identifying information within the transfer service account database 124 to register the customer with the transfer service.

Once the customer has been registered with the transfer service, the transfer service computing system 104 is configured to, upon receipt of a transfer request (e.g., received from the customer device 102, the former provider computing system 110, the current provider computing system 112, or any other device), query the transfer service account database 124 to retrieve the corresponding account information and identifying information associated with recipient and sender transfer service tokens (e.g., the transfer service token of the customer and another transfer service token of another customer) included in the requested transfer. Once the corresponding account information is successfully retrieved by the transfer service computing system 104, the transfer service computing system 104 is configured to initiate a transfer (e.g., of funds) from an account associated with the sender to an account associated with the recipient (e.g., the customer financial account of the customer and a financial account of another customer).

Accordingly, as used herein, a transfer service token is "linked" to a particular customer financial account by the transfer service computing system 104 through creation of an association between the transfer service token and the particular customer financial account within the transfer service account database 124, such that the transfer service token may be utilized to initiate transfers (e.g., of funds) to and/or from the customer financial account via the transfer service.

As discussed above, the transfer service account database 124 stores transfer service tokens, corresponding account information, and corresponding identifying information for various transfer service accounts that are maintained by the transfer service on behalf of its customers. The transfer service account database 124 is configured to be used by the transfer service computing system 104 to enable the real-time or near real-time transfers discussed above.

The billing service computing system 106 is controlled by, managed by, owned by, and/or otherwise associated with a billing service entity (e.g., CheckFree®) that is configured to facilitate automatic bill payments from customers to one or more third parties. In some instances, as shown in FIG. 1, the billing service entity is a third party vendor. In some other instances, the billing service may alternatively be provided by one of the current provider institution or the former provider institution, such that the provider institution performs both the operations described herein as being performed by the current provider computing systems 112 or the former provider computing system 110 and the operations described herein as being performed by the billing service computing system 106.

In some embodiments, billing service computing system 106 may, for example, comprise one or more servers, each with one or more processing circuits including one or more processors configured to execute instructions stored in one or more memory devices, send and receive data stored in the one or more memory devices, and perform other operations to implement the operations described herein associated with certain logic and/or processes depicted in the figures.

Although not specifically shown, it will be appreciated that the billing service computing system 106 may similarly include a network interface circuit, various additional databases (e.g., similar to the billing service account database 126), an account processing circuit (e.g., similar to the account processing circuit 136 of the current provider computing system 112), and other circuits in the same or similar manner to the other components of computing environment 100. In some instances, the network interface circuit may include user interface program logic configured to generate and present application pages, web pages, and/or various other data to users accessing the billing service computing system 106 over the network 116.

The billing service computing system 106 is configured to facilitate automatic bill payments from customers to one or more third-party billers. For example, in some instances, the billing service computing system 106 is configured to receive a registration request from the customer device 102, the former provider computing system 110, and/or the current provider computing system 112 to register the customer. In some instances, the registration request includes customer financial account information (e.g., a customer bank routing number, a customer bank account number) associated with a customer financial account, customer identifying information (e.g., a name, a phone number, an e-mail address, a physical address) associated with the customer, and billing information (e.g., biller identifying information, a bill payment schedule, a biller bank routing number, a biller bank account number) associated with various third-party billing accounts. Upon receiving the registration request, the billing service computing system 106 is configured to create and store a billing service account associated with the customer within the billing service account database 126.

The billing service computing system 106 is then configured to automatically initiate bill payments from the customer financial account linked to the billing service account of the customer to the appropriate third-party billers (e.g., third-party billing accounts associated with the third-party billers) based on the corresponding bill payment schedules. For example, in some instances, the billing service computing system 106 is configured to initiate a push payment (e.g., direct deposit, Bill Pay) from the linked customer financial account to the various third-party billing accounts.

Accordingly, as used herein, a billing service account is "linked" to a particular customer financial account by the billing service computing system 106 through creation of an association between the billing service account and the particular customer financial account within the billing service account database 126, such that the automatic payments made to the third-party billers are sent to the third-party billers from the customer financial account via the billing service.

As discussed above, the billing service account database 126 stores various billing service accounts, customer financial account information, customer identifying information, and a variety of corresponding billing information. The billing service account database 126 is configured to be used by the billing service computing system 106 to facilitate the automatic bill payments discussed above.

The financial data management computing system 108 is controlled by, managed by, owned by, and/or otherwise associated with a financial data management entity (e.g., Plaid™) that is configured to securely manage financial data associated with various customer financial accounts to allow for the authorized convenient sharing of the customer's financial data between various entities. In some instances, as shown in FIG. 1, the financial data management entity is a third party vendor. In some other instances, the financial data management may alternatively be provided by one of the current provider institution or the former provider institution, such that the provider institution performs both the operations described herein as being performed by the current provider computing systems 112 or the former provider computing system 110 and the operations described herein as being performed by the financial data management computing system 108.

In some embodiments, financial data management computing system 108 may, for example, comprise one or more servers, each with one or more processing circuits including one or more processors configured to execute instructions stored in one or more memory devices, send and receive data stored in the one or more memory devices, and perform other operations to implement the operations described herein associated with certain logic and/or processes depicted in the figures.

Although not specifically shown, it will be appreciated that the financial data management computing system 108 may similarly include a network interface circuit, various additional databases (e.g., similar to the billing service account database 126), an account processing circuit (e.g., similar to the account processing circuit 136 of the current provider computing system 112), and other circuits in the same or similar manner to the other components of computing environment 100. In some instances, the network interface circuit may include user interface program logic configured to generate and present application pages, web pages, and/or various other data to users accessing the financial data management computing system 108 over the network 116.

The financial data management computing system 108 is configured to securely manage financial data associated with various customer financial accounts. For example, in some instances, the financial data management computing system 108 is configured to receive a registration request from the customer device 102, the former provider computing system 110, and/or the current provider computing system 112 to register the customer for a financial data management service provided by the financial data management entity. In some instances, the registration request includes various customer financial account information (e.g., customer bank routing numbers, customer bank account numbers) associated with a variety of customer financial accounts, customer financial account access credentials (e.g., passwords, personal identification numbers, social security numbers) associated with the customer's financial accounts, customer transfer service account access credentials (e.g., usernames, passwords) associated with the customer's transfer service account, billing service account access credentials (e.g., usernames, passwords) associated with the customer's billing service account, and other customer identifying information (e.g., a name, a phone number, an e-mail address, a physical address) associated with the customer. Upon receiving the registration request, the financial data management computing system 108 is configured to create and store a financial data management account associated with the customer within the financial data management account database 128.

In some instances, the customer may then provide authorization for various providers, vendors, billers, and other entities to access the customer's various financial data for use in a variety of applications. For example, in some instances, the customer may send an indication of authorization from the customer device 102 to the financial data management computing system 108 indicating that the current provider computing system 112 is authorized to obtain various financial data associated with a customer financial account held at the former provider computing system 110 (e.g., stored within the former provider account database 130).

In some instances, the indication of authorization sent from the customer device 102 to the financial data management computing system 108 includes authentication information configured to authenticate the customer to the financial data management computing system 108 to allow for the customer to authorize the current provider computing system 112 to obtain the customer's various financial data. For example, in some instances, the indication of authorization sent from the customer device 102 may include a password, a passcode, a biometric sample (e.g., a voice sample, a facial scan, a fingerprint), or any other suitable authentication information. In some instances, upon receiving the indication of authorization and the authentication information, the financial data management computing system 108 queries the financial data management account database 128 to search for customer information pertaining to the customer (e.g., by searching for customer information associated with the customer's account) and compares the received authentication information to the stored customer information. Upon determining that the received authentication information matches the stored customer information, the financial data management computing system 108 approves the indication of authorization sent by the customer device 102 and stores the authorization within the customer's account within the financial data management account database 128.

Accordingly, in some instances, the current provider computing system 112 may transmit a request to the financial data management computing system 108 to obtain financial data associated with the customer financial account held at the former provider computing system 110. The financial data management computing system 108 may then obtain the financial data from the former provider computing system 110 via the network 116 using the customer financial account access credentials provided by the customer during the registration process. The financial data management computing system 108 may then transmit the obtained financial data to the current provider computing system 112. For example, in some instances, the financial data obtained from the former provider computing system 110 and provided to the current provider computing system 112 may be recent transaction information from a predetermined time period (e.g., the past three months, the past six months, the past year) to allow for the current provider computing system 112 to identify recurring payments made to third parties, as will be discussed further below.

In some instances, the customer may additionally send an indication of authorization from the customer device 102 to the financial data management computing system 108 indicating that the current provider computing system 112 is authorized to update account information associated with the transfer service and/or the billing service (e.g., stored within the transfer service account database 124 and/or the billing service account database 126). Accordingly, in some instances, the financial data management computing system 108 may allow the current provider computing system 112 to utilize the customer's transfer service account access credentials and/or the customer's billing service account access credentials to update the various account information (e.g., to switch a financial account linked to the customer's transfer service token and/or billing service account).

Accordingly, in some instances, the current provider computing system 112 may generate and transmit a request to update transfer service account information associated with the customer's transfer service account to the transfer service computing system 104 and/or a request to update billing service account information associated with the customer's billing service account to the billing service computing system 106. In some instances, upon approval by the customer, the current provider computing system 112 may include the customer's corresponding transfer service account access credentials or billing service account access credentials within the request sent to the transfer service computing system 104 or billing service computing system 106 to prove that the current provider computing system 112 is authorized to make account changes on behalf of the customer.

As discussed above, the financial data management account database 128 stores various financial data management accounts, customer financial account information, customer financial account access credentials, customer transfer account access credentials, customer billing service account access credentials, and various customer identifying information. The financial data management account database 128 is configured to be used by the financial data management computing system 108 to allow for the authorized sharing of the customer's financial data between various entities.

The former provider computing system 110 is owned by, associated with, or otherwise operated by a provider institution (e.g., a bank or other financial institution) that maintains one or more accounts held by various customers (e.g., the customer associated with the customer device 102), such as demand deposit accounts (e.g., checking accounts, savings accounts), credit card accounts, receivables accounts, and so on. In some instances, the former provider computing system 110, for example, may comprise one or more servers, each with one or more processing circuits having one or more processors configured to execute instructions stored in one or more memory devices to send and receive data stored in the one or more memory devices and perform other operations to implement the methods described herein associated with logic or processes shown in the figures. In some instances, the current provider computing system 112 may comprise and/or have various other devices communicably coupled thereto, such as, for example, desktop or laptop computers (e.g., tablet computers), smartphones, wearable devices (e.g., smartwatches), and/or other suitable devices.

Although not specifically shown, it will be appreciated that the former provider computing system 110 may similarly include a network interface circuit, various additional databases (e.g., similar to the former provider account database 130), an account processing circuit (e.g., similar to the account processing circuit 136 of the current provider computing system 112), and other circuits in the same or similar manner to the other components of computing environment 100. In some instances, the network interface circuit may include user interface program logic configured to generate and present application pages, web pages, and/or various other data to users accessing the former provider computing system 110 over the network 116.

The former provider account database 130 is structured or configured to retrievably store customer financial account information associated with various customer financial accounts held or otherwise maintained by the provider institution on behalf of its customers. In some instances, the customer financial account information may include various transaction information (e.g., historical transaction data) pertaining to transactions completed using the customer financial account over a predetermined time period (e.g., the past three months, the past six months, the past year).

The current provider computing system 112 is similarly owned by, associated with, or otherwise operated by a provider institution (e.g., a bank or other financial institution) that maintains one or more accounts held by various customers (e.g., the customer associated with the customer device 102), such as demand deposit accounts, credit card accounts, receivables accounts, and so on. In the example shown, the current provider entity is different from the former provider entity or institution. The current provider computing system 112 may, for example, comprise one or more servers, each with one or more processing circuits having one or more processors configured to execute instructions stored in one or more memory devices to send and receive data stored in the one or more memory devices and perform other operations to implement the methods described herein associated with logic or processes shown in the figures. In some instances, the current provider computing system 112 may comprise and/or have various other devices communicably coupled thereto, such as, for example, desktop or laptop computers (e.g., tablet computers), smartphones, wearable devices (e.g., smartwatches), and/or other suitable devices.

In some embodiments, the current provider computing system 112 includes one or more I/O devices 132, a network interface circuit 134, an account processing circuit 136, a current provider account database 138, a transaction processing circuit 140, and an account switch circuit 142. The one or more I/O devices 132 are configured to receive inputs from and display information to a user. While the term "I/O" is used, it should be understood that the I/O devices 132 may be input-only devices, output-only devices, and/or a combination of input and output devices.

In some instances, the network interface circuit 134 includes, for example, program logic that connects the current provider computing system 112 to the network 116. The network interface circuit 134 facilitates secure communications between the current provider computing system 112 and each of the customer device(s) 102, the transfer service computing system 104, the billing service computing system 106, the financial data management computing system 108, the former provider computing system 110, and the one or more third-party computing systems 114. The network interface circuit 134 also facilitates communication with other entities, such as other banks, settlement systems, and so on. The network interface circuit 134 further includes user interface program logic configured to generate and present web pages to users accessing the current provider computing system 112 over the network 116.

The account processing circuit 136 is structured or configured to perform a variety of functionalities or operations to enable and monitor various customer activities (e.g., account processing, product registration processing, account monitoring, etc.) in connection with customer account information stored within a current provider account database 138. In some instances, the account processing circuit 136 performs various functionalities to enable account opening and/or closing actions, product registration and/or closing actions (e.g., registering for and/or closing various accounts associated with the transfer service computing system 104, the billing service computing system 106, and/or the financial data management computing system 108), account withdrawals and deposits (e.g., account credits and debits to checking and savings accounts), various customer account tracking activities, and/or a variety of other services associated with and/or provided by the provider.

The current provider account database 138 is structured or configured to retrievably store customer account information associated with various customer accounts held or otherwise maintained by the current provider institution on behalf of its customers. In some instances, the customer account information includes both customer information and account information pertaining to a given customer account. For example, in some instances, the customer information may include a name, a phone number, an e-mail address, a physical address, etc. of the customer associated with the customer account. In some instances, the account information may include transaction information, information pertaining to the type and corresponding capabilities of the given account, a transfer service token associated with the customer account, a billing service account held by the billing service computing system 106 associated with the customer account, a financial data management account held by the financial data management computing system 108 associated with the customer account, etc.

The transaction processing circuit 140 is structured or configured to facilitate various customer transactions (e.g., the customer sending funds to a recipient, the customer receiving funds from a sender, etc.). In some instances, the transaction processing circuit 140 is further structured to incorporate at least some of the functionalities offered by the transfer service computing system 104 (e.g., via one or more APIs or SDKs of the transfer service computing system 104) to allow for customers to send and receive transfers of funds using transfer service tokens (e.g., via the customer client application 122 provided to the customer device 102 by the current provider computing system 112). Accordingly, in some instances, the transaction processing circuit 140 is further structured to facilitate various transfer service fund transfers conducted by the customers.

The account switch circuit 142 is structured to enable various functionalities described herein. For example, in some instances, the account switch circuit 142 is structured to determine whether a customer is registered for the transfer service (e.g., has a transfer service token) provided by the transfer service computing system 104. In some instances, the account switch circuit 142 is further structured to generate a prompt asking the customer if they would like to switch the financial account linked to the transfer service, the billing service, and/or used for various bill payments from a financial account held at the former provider to a financial account held at the current provider. In some instances, the account switch circuit 142 is then further structured to perform a variety of functions to facilitate the switching of the financial account linked to the transfer service, the billing service, and/or used for the various bill payments from the financial account held at the former provider to the financial account held at the current provider, as will be described in detail below, with respect to FIG. 3.

With an example structure of the computing environment 100 being described above, example processes performable by the computing environment 100 (or components/systems thereof) will be described below. It should be appreciated that the following processes are provided as examples and are in no way meant to be limiting. Additionally, various method steps discussed herein may be performed in a different order or, in some instances, completely omitted. These variations have been contemplated and are within the scope of the present disclosure.

Figure 2:
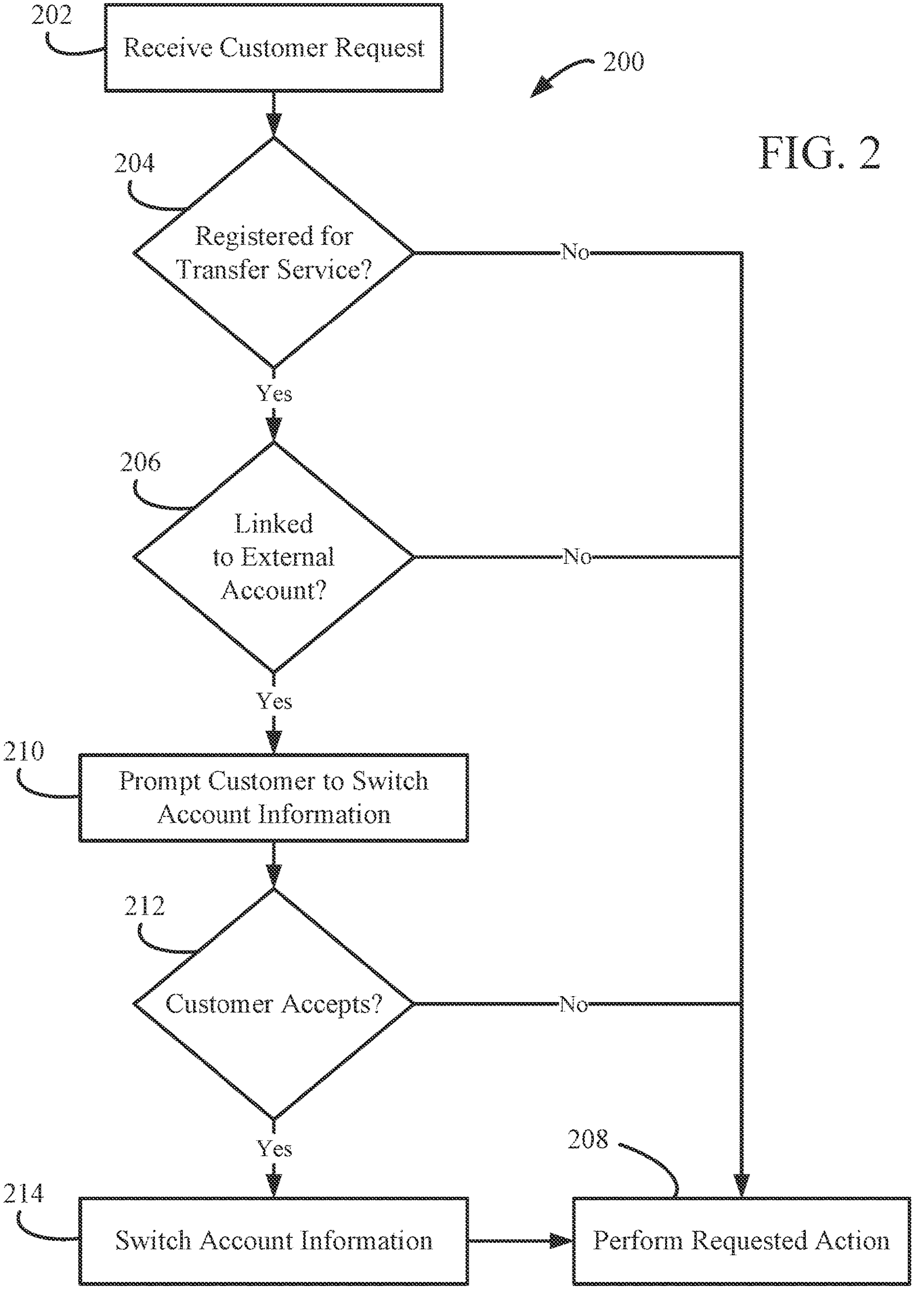
FIG. 2 is flow diagram of a method for prompting a customer to perform an account switch, according to an example embodiment.

Referring now to FIG. 2, a flow diagram of a method 200 for prompting the customer to perform an account switch is shown, according to an example embodiment. For example, the method 200 relates to prompting the customer as to whether they would like to switch a financial account linked to the transfer service, linked to the billing service, and/or used for various bill payments from a former financial account held at the former provider to a current financial account held at the current provider institution in response to a customer request.

As shown, the method 200 begins by the current provider computing system 112 receiving a customer request, at step 202. For example, in some instances, the account processing circuit 136 or the transaction processing circuit 140 may receive a customer request from the customer (e.g., the customer device 102) to perform an action associated with the current provider institution. In some instances, the requested action may be a request to make a mortgage payment, a request to make a credit card payment, a request to apply for a new line of credit, a request for a checking account withdrawal, a request to transfer funds to another person, or any other type of customer requestable action, as desired for a given application.

In some instances, upon receiving the customer request, at step 202, the current provider computing system 112 (e.g., the account processing circuit 136) may further determine whether the customer has a financial account (e.g., a deposit account) held by the current provider institution by searching the current provider account database 138. If the current provider determines that customer is currently only a consumer lending customer (e.g., the customer only has a mortgage with the current provider institution), the current provider computing system 112 may transmit a prompt to the customer device 102 for the customer to open a financial account (e.g., a deposit account). If the customer indicates, via the customer device 102, that they would like to open a new financial account at the current provider institution, the customer device 102 may transmit a corresponding notification to the current provider computing system 112, and the current provider computing system 112 may open a new financial account associated with the customer.

The current provider computing system 112 then determines whether the customer is registered for the transfer service, at step 204, and, if so, whether a transfer service token of the customer is linked to an external account (e.g., a financial account held by a provider institution other than the current provider institution), at step 206. For example, in some instances, the account processing circuit 136 and/or the transaction processing circuit 140 are structured to transmit the customer request details to the account switch circuit 142. In some instances, the account switch circuit 142 is then structured to, in response to receiving the customer request details, transmit a transfer service query to the transfer service computing system 104 asking whether the customer is registered for the transfer service and, if so, whether a transfer service token of the customer is linked to a financial account held by another provider institution (e.g., the former provider institution associated with the former provider computing system 110).

In some instances, the account switch circuit 142 may generate and transmit a prompt to the customer device 102 asking the customer directly whether the customer is registered for the transfer service and, if so, what transfer service token the customer is registered using (e.g., what phone number or e-mail address the customer is using as their transfer service token). In these instances, the account switch circuit 142 may then receive a notification from the customer device 102 including an indication of whether the customer is registered for the transfer service and what, if any, transfer service token the customer is registered using. Accordingly, the account switch circuit 142 may then transmit a similar transfer service query to the transfer service computing system 104 asking whether the customer's transfer service token is linked to a financial account held by another provider institution (e.g., the former provider institution associated with the former provider computing system 110). In either case, in some instances, the account switch circuit 142 may transmit the transfer service query to or otherwise communicate with the transfer service computing system 104 via one or more transfer service application programming interfaces (APIs) provided by the transfer service computing system 104.

In some instances, the customer request details may include various customer information, such as a phone number and/or an e-mail address, which may also be in use by the customer as a transfer service token with the transfer service. In many instances, this customer information may be generally included as part of a particular customer request. For example, if the customer request pertains to a consumer credit application, during the process of the consumer credit application, the customer typically provides their phone number and/or e-mail address.

Accordingly, the current provider computing system 112 may generate the transfer service query to include the received customer information (e.g., the phone number and/or the e-mail address) and a request for the transfer service to indicate whether the customer information corresponds to (e.g., matches) a transfer service token linked to a financial account held by another provider institution.

Upon receipt of the transfer service query, the transfer service computing system 104 is structured to search the transfer service account database 124 to determine whether the customer information corresponds to such a transfer service token. If the transfer service computing system 104 determines that the customer information corresponds to a transfer service token, the transfer service computing system 104 determines that the customer is registered for the transfer service. Further, upon determining that the customer is registered for the transfer service, the transfer service computing system 104 identifies the financial account linked to the transfer service token and the corresponding provider institution associated with that financial account based on the transfer service account of the customer stored within the transfer service account database 124.

The transfer service computing system 104 is then further structured to generate and transmit a notification to the current provider computing system 112 (e.g., the account switch circuit 142) indicating whether the customer is registered for the transfer service and, if so, whether the transfer service token of the customer is linked to a financial account held by another provider institution.

It should be appreciated that, in some instances, unlike a traditional transfer service request for transferring resources (e.g., funds) between registered users of the transfer service (e.g., typically including a sender transfer token, a recipient transfer token, and a transfer amount), the transfer service query triggers a different and separate process (i.e., the transfer service computing system 104 searching the transfer service account database 124, as described above). As such, in some instances, the transfer service query sent from the current provider computing system 112 to the transfer service computing system 104 includes a trigger component configured to be automatically detected by the transfer service computing system 104 to trigger this different and separate process.

For example, in some instances, in addition to the received customer information (e.g., the phone number and/or the e-mail address) and the request for the transfer service to indicate whether the customer information corresponds to (e.g., matches) the transfer service token linked to the financial account held by another provider institution, the transfer service query may include a predetermined query code configured to be recognized by the transfer service computing system 104 as being part of a transfer service query and as not being part of a traditional transfer service request for a transfer of resources. For example, in some instances, the predetermined query code may be a code having a predetermined number or arrangement of letters, numbers, symbols, etc., that may be recognized by the transfer service computing system 104 as being indicative a transfer service query. Accordingly, in some instances, upon receipt of a communication from the current provider computing system 112 including the predetermined query code, the transfer service computing system 104 identifies the predetermined query code and, in response to identifying the predetermined query code, automatically performs the search of the transfer service account database 124 for a transfer service token that is associated with the customer information included in the transfer service query, as discussed above with respect to step 204.

In some instances, upon receiving the transfer service query and identifying the predetermined query code, the transfer service computing system 104 may further automatically send a prompt to the customer device 102 associated with the customer to request permission for sending the indication of whether the customer has the transfer service token and the related account information associated with the transfer service token to the current provider computing system 112. In some instances, the prompt sent to the customer device 102 may include a simple "yes" or "no" response option set. In some other instances, the prompt sent to the customer device 102 may include an authentication request requesting that the customer provide authentication information, such as a passcode or a biometric sample (e.g., a voice sample, a facial scan, a fingerprint scan), via the customer device 102 to be used in authenticating the customer to the transfer service computing system 104. Accordingly, in some instances, the transfer service computing system 104 may perform the aforementioned search of the transfer service account database 124 in response to receiving the requested authentication information from the customer (e.g., via the customer device 102).

It should be appreciated that, in some instances, the transfer service computing system 104 providing the indication of whether the customer is registered for the transfer service and the information pertaining to the financial account held at the other financial institution to the current provider computing system 112 in response to the transfer service query enables the current provider computing system 112 to automatically switch the customer's transfer token and all (or any selected subset) of the customer's automated or otherwise recurring payments from being linked to the account held at the other financial institution to being linked to the financial account held at the current financial institution, as described herein.

If the current provider computing system 112 determines, based on the received notification from the transfer service computing system 104, that the customer is not registered for the transfer service, at step 204, or that the transfer service token of the customer is not linked to a financial account held by another provider institution, at step 206, the current provider computing system 112 then proceeds to perform the customer's requested action, at step 208.

Alternatively, if the current provider computing system 112 determines, based on the received notification from the transfer service computing system 104, that the customer is registered for the transfer service, at step 204, and that the transfer service token of the customer is linked to a financial account held by another provider institution, at step 206, the current provider computing system 112 then prompts the customer to switch their account information, at step 210. For example, in some instances, the current provider computing system 112 (e.g., the account switch circuit 142) generates and transmits a graphical user interface (e.g., graphical user interface 400 or graphical user interface 500, shown in FIGS. 4 and 5, respectively) to the customer device 102.

In some instances, the graphical user interface includes a prompt (e.g., the prompt 402, shown in FIG. 4) and an interactive button (e.g., the interactive account switch button 404, shown in FIG. 4) configured to allow the customer switch the financial account linked to the transfer service token from the external account (e.g., a former financial account held at the former provider institution) to a current financial account held at the current provider institution. In some instances, the graphical user interface includes a prompt (e.g., the prompt 502, shown in FIG. 5) and an interactive button (e.g., the interactive account switch button 504, shown in FIG. 5) configured to allow the customer to additionally or alternatively switch the financial account linked to or otherwise associated with various billing information from the external account to the current financial account held at the current provider institution, as will be discussed further below.

If the customer declines to switch their account information, at step 210, the current provider computing system 112 then similarly proceeds to perform the customer's requested action, at step 208. Alternatively, if the customer accepts to switch their account information, at step 210, the current provider computing system 112 proceeds to switch the customer's account information, at step 214. For example, the current provider computing system 112 (e.g., the account switch circuit 142) switches the financial account linked to or otherwise associated with the transfer service token and/or the billing information from the external account to the current financial account held at the current provider institution, as specifically explained below, with reference to FIG. 3.

In some instances, if the customer has already authorized the current provider computing system 112 to obtain financial data associated with the external account (e.g., the former financial account held by the former provider institution) and to update the various account information associated with the transfer service and/or billing service (e.g., via the financial data management computing system 108, as described above), the current provider computing system 112 may proceed to switch the customer's account information, at step 214, without any additional input from the customer. Alternatively, if the customer has not already provided these authorizations to the current provider computing system 112, the current provider computing system 112 (e.g., the account switch circuit 142) may transmit one or more individual authorizations requests to the customer device 102 requesting authorization (e.g., account access credentials associated with the transfer service, the billing service, the former provider institution) to obtain the financial data and/or update the various account information discussed above. In these instances, once the customer has approved the authorizations, the current provider computing system 112 may proceed to switch the customer's account information, at step 214.

In some instances, if the external account is a joint account held by multiple people, the current provider computing system 112 may also request permission to switch the account information from the additional account holder(s) associated with the joint account prior to switching the customer's account information, at step 214. Similarly, if the external account is a business account held by a business, the current provider computing system 112 may also request permission to switch the account information from the business associated with the business account prior to switching the customer's account information, at step 214

For example, in some instances, once the customer has authorized the current provider computing system 112 to obtain financial data associated with the external account, the current provider computing system 112 obtains account information associated with the external account from the former provider computing system 110 via the financial data management computing system 108. In some instances, the obtained account information includes an indication of the account holders associated with the external account (e.g., the customer, other individuals, businesses), as well as contact information for the account holders (e.g., phone numbers, e-mail addresses).

Accordingly, in some instances, the current provider computing system 112 may determine that the external account is a joint account or a business account based on the obtained account information. In these instances, the current provider computing system 112 may then request permission to perform the account switch from the additional account holder(s) associated with the joint account or the business associated with the business account. For example, in some instances, the current provider computing system 112 may request permission by sending a prompt (e.g., via a text, an automated call, an e-mail) to one or more customer devices 102 associated with the additional account holder(s) or a business computing system (e.g., similar to the third-party computing system 114) associated with the business. In some instances, the prompt may include a link configured to allow the additional account holder(s) or the business to provide authentication information to be used to authenticate the additional account holder(s) or the business prior to the additional account holder(s) or business granting permission for the account switch.

Once the current provider computing system 112 has switched the customer's account information, at step 214, the current provider computing system 112 then similarly proceeds to perform the customer's requested action, at step 208.

Figure 3:
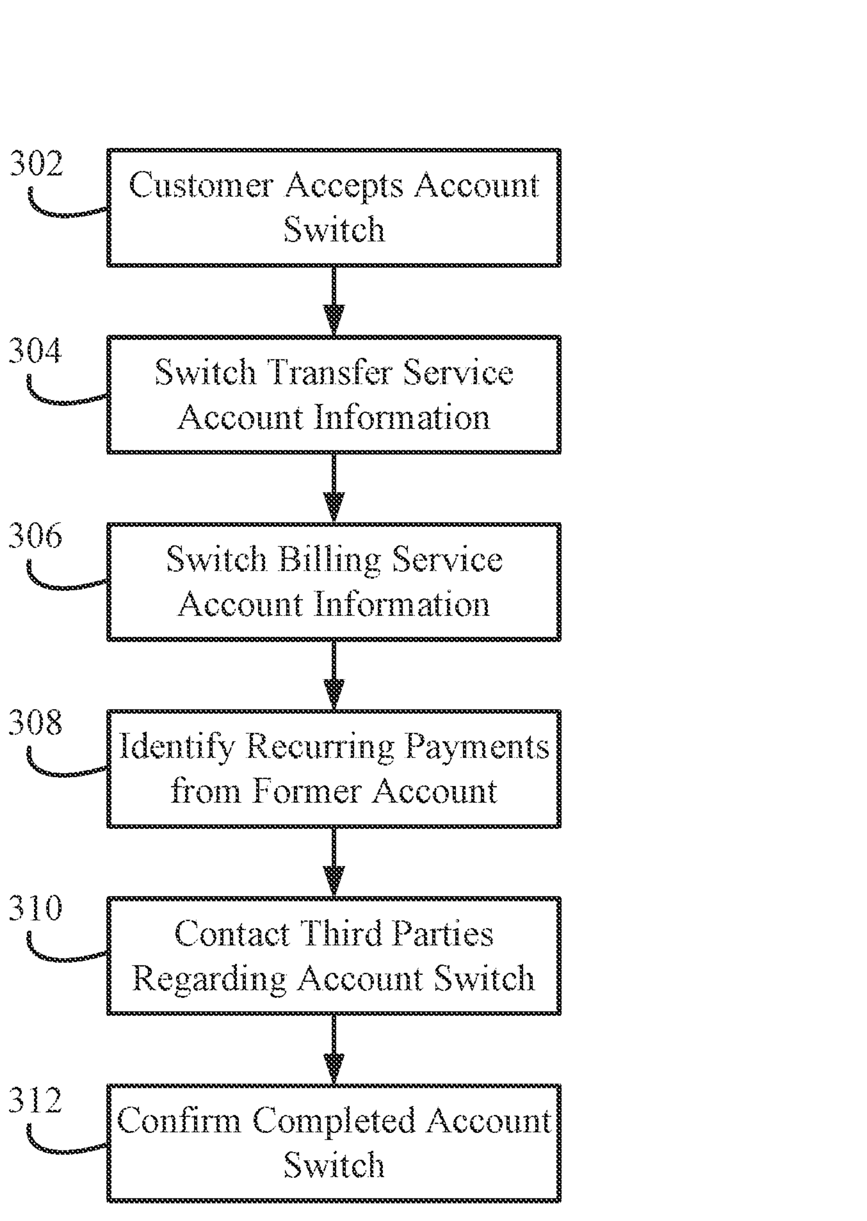
FIG. 3 is a flow diagram of a method for performing an account switch, according to an example embodiment.

Referring now to FIG. 3, a flow diagram of a method 300 for performing an account switch is shown, according to an example embodiment. For example, the method 300 relates to switching the financial account linked to or otherwise associated with the transfer service token and/or the billing information of the customer from the external account to the current financial account held at the current provider institution is shown, according to an example embodiment.

As shown, the method 300 begins by the customer accepting to switch their account information, at step 302. For example, the customer may interact with the interactive button (e.g., the interactive account switch button 404 or the interactive account switch button 504) to accept to switch their account information. Upon the customer interacting with the interactive button, the customer device 102 transmits an account switch acceptance notification to the current provider computing system 112.

In some instances, upon receiving the account switch acceptance notification from the customer device 102, the current provider computing system 112 proceeds to initiate a switch of transfer service account information associated with the customer's transfer service account, at step 304. For example, upon receiving the account switch acceptance notification, the current provider computing system 112 transmits a transfer service token switch request to the transfer service computing system 104. The transfer service token switch request includes a request to switch the transfer service token of the customer from being linked to the external account (e.g., the former account held by the former provider institution) to being linked to the current financial account held at the current provider institution. In some instances, the transfer service token switch request may further include the transfer service token of the customer and current financial account information associated with the current financial account held at the current provider institution.

Accordingly, upon receiving the transfer service token switch request from the current provider computing system 112, the transfer service computing system 104 updates the transfer service account information of the customer stored within the transfer service account database 124 to link the current financial account with the transfer service token of the customer. As such, once the transfer service token of the customer has been linked to the current financial account, future transfers initiated using the transfer service token via the transfer service will either push resources from the current financial account to a recipient account or receive resources sent from a sender account within the current financial account.

In some instances, the current provider computing system 112 additionally proceeds to initiate a switch of billing service account information associated with the customer's billing service account, at step 306. For example, in some instances, the current provider computing system 112 (e.g., the account switch circuit 142) transmits a billing service account switch request to the billing service computing system 106. The billing service switch request includes a request to switch the billing service account of the customer from being linked to the external account (e.g., the former account held by the former provider institution) to being linked to the current financial account. In some instances, the billing service switch request may further include various customer identifying information (e.g., the customer's name, phone number, e-mail address, physical address) associated with the billing service account and the current financial account information.

Accordingly, upon receiving the billing service switch request from the current provider computing system 112, the billing service computing system 106 may similarly update the billing service account information stored within the billing service account database 126 to link the current financial account with the billing service account of the customer. As such, once the billing service account of the customer has been linked to the current financial account, future automatic bill payments initiated from the customer to the one or more third-party billers via the billing service will be pushed from the current financial account to one or more third-party accounts associated with the one or more third-party billers.

In some instances, by updating the billing service account of the customer to link the billing service account to the current financial account, the current provider computing system 112 effectively shifts a cluster or module of the customer's bill payments associated with a plurality of third-party billers from the external account (e.g., the former financial account held at the former provider computing system 110) to the current financial account held at the current provider computing system 112 simultaneously.

In some instances, the current provider computing system 112 additionally proceeds to identify recurring payments from the external account (e.g., the former account held at the former provider institution), at step 310, and to contact various third parties regarding the account switch, at step 312.

For example, in some instances, the current provider computing system 112 transmits a financial data request to the financial data management computing system 108 to obtain various financial data associated with the external account (e.g., the former account held at the former provider institution). In some instances, the financial data request may include customer identifying information (e.g., customer name, customer e-mail address, customer physical address), customer financial account information (e.g., a routing number associated with the external account, an account number of the external account, an external provider associated with the external account), and a request for recent transaction information from a predetermined time period (e.g., the past three months, the past six months, the past year).

Accordingly, upon receiving the financial data request, the financial data management computing system 108 identifies the corresponding financial data management account of the customer (e.g., based on the customer identifying information). The financial data management computing system 108 then determines whether the current provider computing system 112 has been authorized by the customer to obtain the requested recent transaction information from the external account. For example, if the customer has authorized the current provider computing system 112 to obtain the requested recent transaction information, an indication of this authorization may be stored within the financial data management account of the customer within the financial data management account database 128. If the current provider computing system 112 has not been previously authorized, the financial data management computing system 108 may generate and transmit a request for this authorization to the customer device 102, such that the customer can authorize the financial data request in real-time or nearly real-time.

Once the financial data management computing system 108 has identified the financial data management account of the customer and verified that the current provider computing system 112 is authorized to obtain the requested recent transaction information from the external account, the financial data management computing system 108 then pulls the recent transaction information from the external account (e.g., the former provider account stored within the former provider account database 130 of the former provider computing system 110) over the network 116. For example, the financial data management computing system 108 may utilize customer financial account access credentials provided by the customer during the customer's registration process for registering with the financial data management service to securely access former provider account information associated with the former provider account of the customer and to pull the requested recent transaction information. The financial data management computing system 108 then transmits the requested recent transaction information to the current provider computing system 112.

In some instances, once the current provider computing system 112 receives the recent transaction information from the external account (e.g., the former financial account), the current provider computing system 112 (e.g., the account switch circuit 142) identifies recurring payments to third parties within the customer's recent transactions. For example, in some instances, the recent transaction information may include a payee associated with each payment made from the external account, an amount associated with each payment, and a timestamp associated with each payment. Accordingly, the current provider computing system 112 may identify any payments of a similar amount (e.g., within five percent or ten percent) made to the same payee at regular intervals (e.g., daily, weekly, bi-weekly, monthly, annually) as being recurring payments. For example, in some instances, the current provider computing system 112 may identify a recurring rent payment to a particular landlord, a recurring phone bill paid to a phone company, a recurring cable payment made to a cable provider, a monthly subscription to a subscription service, etc., as recurring payments based on the customer's recent transaction information.

Once the current provider computing system 112 has identified the recurring payments made from the external account, the current provider computing system 112 may then compile a list or repository of third parties to which the customer has made the recurring payments to using the external account. In some instances, the current provider computing system 112 may store this list or repository within the customer account of the customer within the current provider account database 138.

The current provider computing system 112 then transmits account switch notifications to each of the various third parties (e.g., the third-party computing systems 114) to which the customer has made recurring payments to using the external account indicating that future payments should be pulled from the current financial account held at the current provider institution instead of the external account held at the external provider institution (e.g., the former financial account held at the former financial institution).

For example, the third parties associated with the third-party computing systems 114 may be various service providers and/or vendors with whom the customer has regularly interacted or who the customer has set up automatic bill payments with. For example, in some instances, the third parties may be various utility providers, credit card providers, auto-loan providers, subscription services, and/or various other service providers and/or vendors who regularly bill the customer. For example, when registering for various services, the customer may provide financial account information (e.g., a bank routing number, a bank account number) to each of the third parties for billing purposes. Specifically, the customer may originally provide financial account information associated with the external account (e.g., the former financial account), such that the third parties are able to pull regular bill payments (e.g., an ACH debit or direct debit) from the external account to pay for various bills or other charges.

Accordingly, the account switch notification sent to each of the third-party computing systems 114 may include customer identifying information associated with the customer, current financial account information (e.g., bank routing number, bank account number) associated with the current financial account of the customer, and an indication that the third party should no longer pull bill payments from the external account and should instead pull all future bill payments from the current financial account. As such, each of the various third parties may update corresponding customer accounts associated with the customer (e.g., within an account database similar to the databases of the other systems described herein) such that future bill payments are pulled from the current financial account.

It should be appreciated that, although the switch of the transfer service account, at step 304, the switch of the billing service account information, at step 306, the identification of the recurring payments, at step 308, and the contacting of the third parties, at step 310 are described in a particular sequence, in some instances, these steps may be performed in various alternative sequential orders or multiple of these steps may be performed simultaneously. Furthermore, in some instances, one or more of these steps may be omitted, as desired by the customer or for a given application.

In some instances, once the transfer service account information has been switched, the billing service account information has been switched, the recurring payments have been identified, and/or the third parties have been contacted to pull from the current financial account, the current provider computing system 112 (e.g., the account switch circuit 142) is configured to confirm the completed account switch to the customer, at step 312. For example, in some instances, the current provider computing system 112 (e.g., the account switch circuit 142) is configured to generate a graphical user interface (e.g., graphical user interface 600) including an account switch confirmation and to transmit the graphical user interface to the customer device 102. In some instances, the account switch information may include a list of transfer service tokens and bill payments that were successfully switch and will now be linked to or paid using the current financial account.

It will be appreciated that, while the systems and methods described herein are generally described in reference to switching transfer service tokens and/or bill payments linked to or associated with a single external financial account to the current financial account, in some instances, the systems and methods described herein may be utilized to switch transfer service tokens and/or bill payments linked to or associated with a variety of external financial accounts to the current financial account by repeating the various method steps described above for multiple external financial accounts.

For example, in some instances, the customer may have multiple transfer service tokens linked to multiple external financial accounts. These transfer service tokens may correspond to multiple different phone numbers and/or e-mail addresses. Accordingly, in some instances, the transfer service query sent from the current provider computing system 112 may include multiple phone numbers and/or e-mail addresses of the customer and may ask whether each phone number and e-mail is registered as a transfer service token registered with the transfer service and linked to an external financial account. In some instances, if multiple transfer service tokens linked to multiple external financial accounts are identified, the current provider computing system 112 is configured to transmit a prompt to the customer device 102 asking the customer if they would like to perform an account switch with regard to all of the external financial accounts or any subset of the external financial accounts, to each be switched in a similar manner to that described above.

Further, in some instances, to determine whether the customer has any additional external financial accounts, the current provider computing system 112 may utilize various customer information acquired via the processes described above to obtain a credit close-up (CCU) report pertaining to the customer from one or more credit bureaus and/or to obtain information necessary to generate a deposit close-up (DCU) report pertaining to the customer.

For example, in some instances, the CCU report may provide the current provider computing system 112 with information as to lines of credit held by the customer. If various lines of credit are not linked to the current financial account or a known external financial account, then the current provider computing system 112 may determine that the customer has one or more unknown external financial accounts. In this case, the current provider computing system 112 (e.g., the account switch circuit 142) may generate and transmit a prompt to the customer asking whether they have any additional external financial accounts linked to transfer service tokens or having associated recurring bill payments that they would like to have switched to the current financial account.

In some instances, to generate the DCU report, the current provider computing system 112 may pull various information that the customer has authorized the current provider computing system 112 to pull from the transfer service computing system 104, the billing service computing system 106, and/or the financial data management computing system 108. The current provider computing system 112 may then fill in a template DCU report with the pulled information. For example, in some instances, the DCU report may include customer financial account information (e.g., bank routing numbers, bank account numbers), transfer service tokens, bill payment information, etc. of the customer. The current provider computing system 112 may then transmit the DCU report to the customer device 102 to be verified by the customer. In some instances, the DCU report may be transmitted to the customer device 102 along with a request that the customer provide any additional missing information to ensure that the DCU report is an accurate and complete report of the customer's deposit account information.

Figure 4:
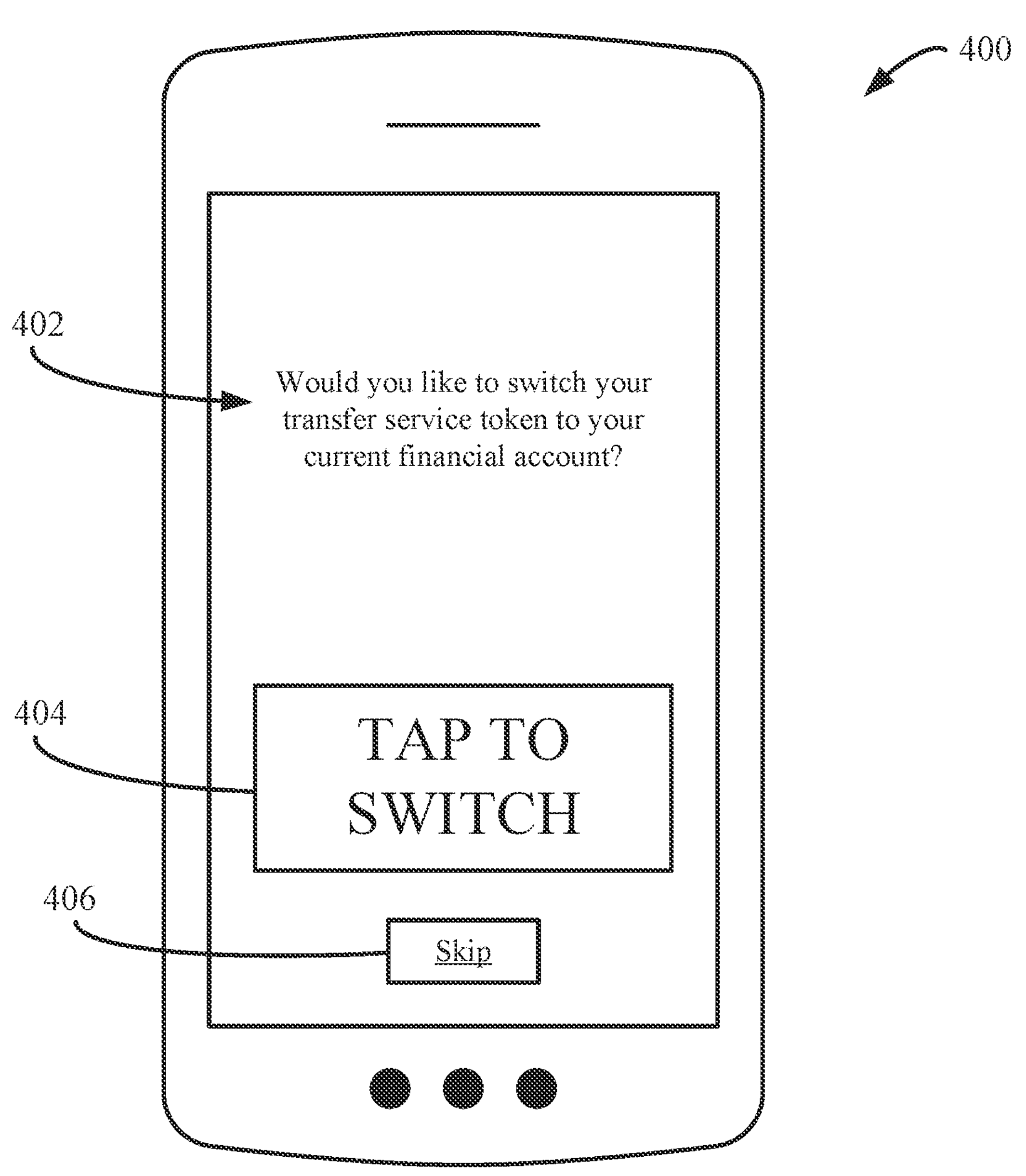
FIG. 4 is a graphical user interface including a prompt for the customer to perform an account switch, according to an example embodiment.
Figure 5:
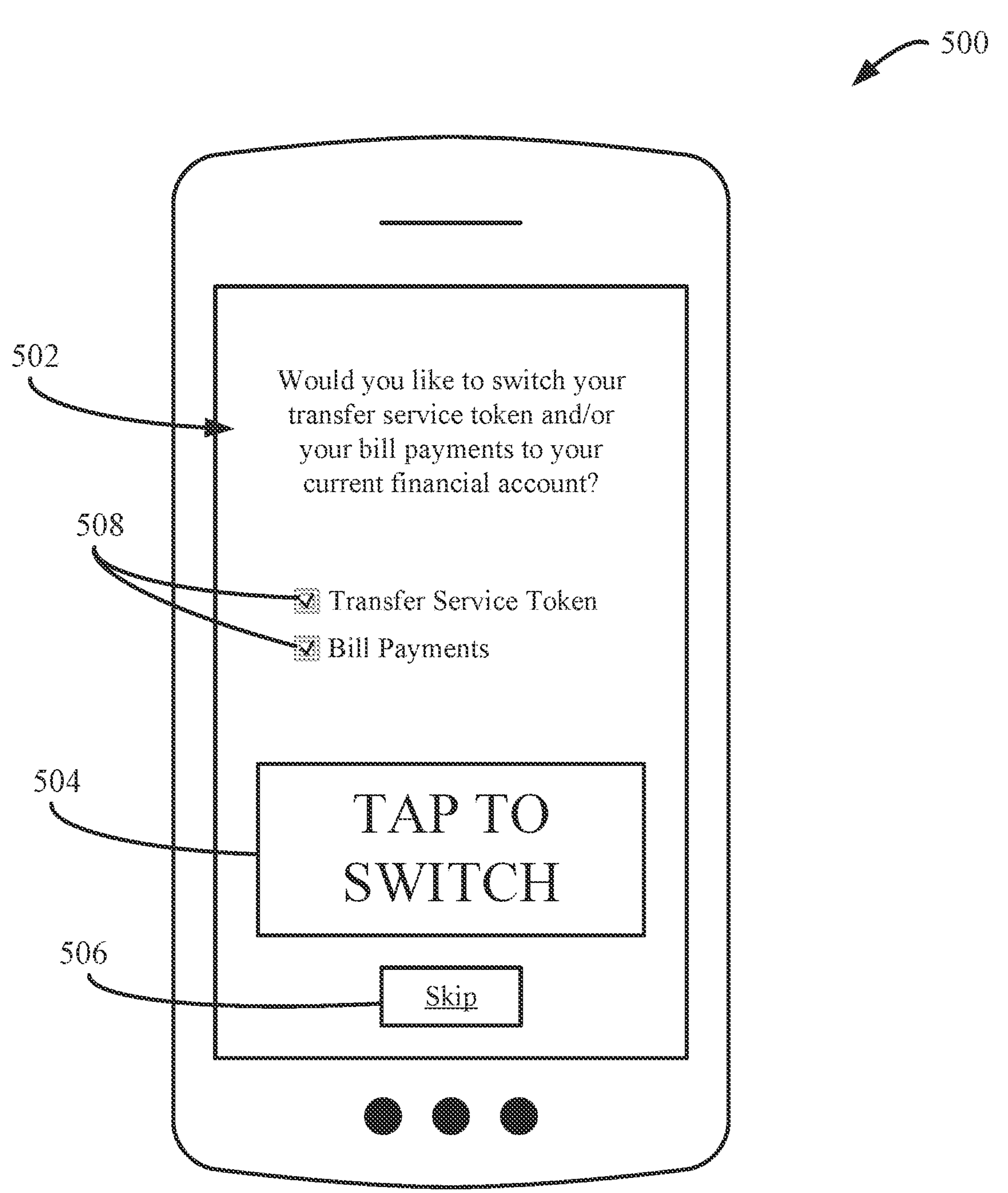
FIG. 5 is another graphical user interface including a prompt for the customer to perform an account switch, according to an example embodiment.
Figure 6:
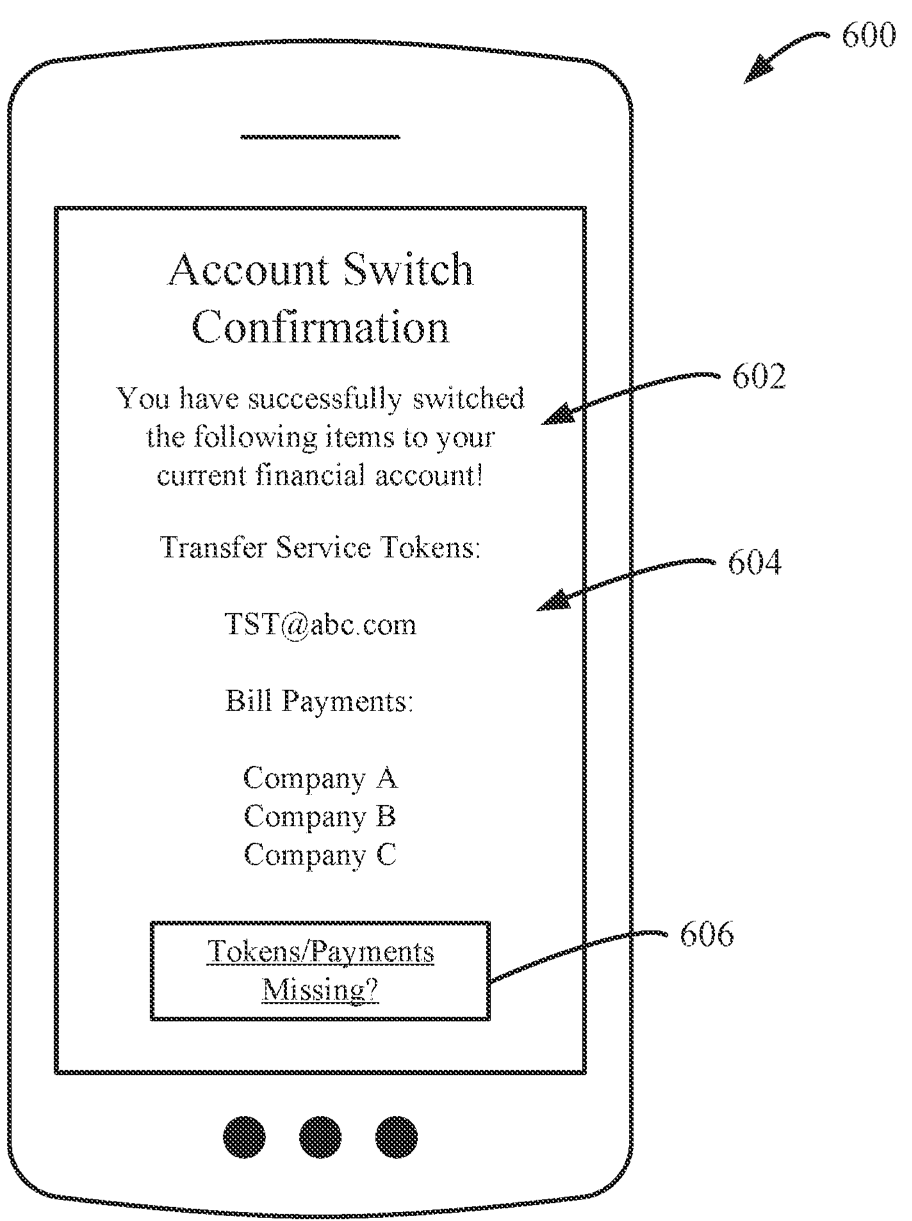
FIG. 6 is a graphical user interface including an account switch confirmation, according to an example embodiment.

Referring now to FIGS. 4-6 generally, various graphical user interfaces are shown, according to example embodiments. It will be appreciated that the various graphical user interfaces are provided as examples and are in no way meant to be limiting. In some instances, the various graphical user interfaces provided to the customer device 102 may include additional information, interactive features, and/or other elements generally, in the same or different arrangements, without departing from the scope of the present disclosure.

Referring now to FIG. 4, a graphical user interface 400 is shown, according to an example embodiment. As illustrated, the graphical user interface 400 includes a prompt 402, an interactive account switch button 404, and an interactive skip button 406. The prompt 402 includes a message asking whether the customer would like to switch their transfer service token to be linked to the current financial account. The interactive account switch button 404 is configured to transmit the customer account switch acceptance notification to the current provider computing system 112 to initiate the account switch described herein. The interactive skip button 406 is configured to allow the customer to skip or otherwise decline to have their linked or associated financial account switched.

Referring now to FIG. 5, a graphical user interface 500 is shown, according to an example embodiment. As illustrated, the graphical user interface 500 similarly includes a prompt 502, an interactive account switch button 504, and an interactive skip button 506. However, the prompt 502 includes a message asking whether the customer would like to switch their transfer service token and/or their bill payments to be linked to or otherwise paid from the current financial account. Accordingly, the graphical user interface 500 further includes selectable check boxes 508 configured to allow the customer to select whether they would like to switch their transfer service token, their bill payments, or both to the current financial account.

In some instances, the selectable check boxes 508 may include a selectable check box corresponding to each of the customer's individual bills or otherwise recurring payments and thereby allow for the customer to select a subset of the various bills or otherwise recurring payments to have switched from being linked to or paid from the previous financial account to being linked to or paid from the current financial account. Accordingly, in the instance that the customer is not planning to close the previous financial account and wishes for a subset of their bill payments to continue being drawn from the previous financial account, while also switching one, some, or most of their bill payments to be drawn from the current financial account, the customer may select which account they would like each of their bill payments to be drawn from in a single process via the graphical user interface 500. That is, in some instances, the graphical user interface 500 allows the customer, for each individual bill or otherwise recurring payment, to selectively opt in or out of having the individual bill or otherwise recurring payment switched from the previous financial account to the current financial account.

The interactive account switch button 504 is then configured to transmit the customer account switch acceptance notification (e.g., specifying which of the transfer service token and/or bill payments the customer would like to switch) to the current provider computing system 112 to initiate the account switch described herein. The interactive skip button 506 is similarly configured to allow the customer to skip or otherwise decline to have their linked or associated financial account switched.

Referring now to FIG. 6, a graphical user interface 600 is shown, according to an example embodiment. As illustrated, the graphical user interface 600 includes an account switch confirmation 602 and various account switch details 604. The account switch confirmation 602 includes a message indicating that the customer has successfully switched various items to the current financial account. The account switch details 604 include a list of the various transfer tokens and bill payments (e.g., including both bill payments associated with the biller service account of the customer and bill payments associated with identified recurring payments from the former financial account) that were successfully switched.

In some instances, the graphical user interface 600 further includes an interactive missing tokens/payments button 606 configured to allow the customer to provide additional tokens or bill payments that they would like to have switched.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A computer-implemented method comprising:

receiving, by a provider computing system associated with a provider, a customer request from a customer device of a customer to perform an action associated with a new account to be opened or an existing account held by the provider, the customer request including customer information regarding the customer;

in response to receiving the customer request including the customer information:

transmitting, by the provider computing system, a transfer service query requesting transfer service information regarding the customer to a transfer service computing system, the transfer service query including the customer information of the customer and a query code, the query code configured to be recognized by the transfer service computing system as being part of the transfer service query instead of a transfer service request for a transfer of resources via a transfer service provided by the transfer service computing system, the query code configured to trigger an automatic search by the transfer service computing system for transfer service tokens of the customer based on the customer information;

receiving, by the provider computing system, a notification from the transfer service computing system indicating that a transfer service token of the customer is linked to a third-party customer account held by a third-party provider, the transfer service token comprising an identifier linked to the third-party customer account that is configured to enable transfers using the third-party customer account via the transfer service provided by the transfer service computing system;

in response to receiving the notification indicating that the transfer service token is linked to the third-party customer account from the transfer service computing system:

generating, by the provider computing system, a graphical user interface including a selectable option, the selectable option, when selected by the customer, being configured to switch the transfer service token from being linked to the third-party customer account held by the third-party provider to being linked to a customer account held by the provider associated with the provider computing system; and transmitting, by the provider computing system, the graphical user interface to the customer device associated with the customer;

receiving, by the provider computing system, a selection of the selectable option via the graphical user interface from the customer device; and in response to receiving the selection of the selectable option, transmitting, by the provider computing system, a transfer service token switch request to the transfer service computing system, the transfer service token switch request initiating a switch of the transfer service token from being linked to the third-party customer account held by the third-party provider to being linked to the customer account held by the provider; and performing, by the provider computing system, the action requested by the customer.

2. The computer-implemented method of claim 1, wherein the third-party customer account is further linked to a billing service account associated with a billing service computing system configured to facilitate an automatic bill payment from the customer to one or more third parties, the selectable option is further configured to switch the billing service account from being linked to the third-party customer account to being linked to the customer account held by the provider, and the computer-implemented method further comprises:

in response to receiving the selection of the selectable option, transmitting, by the provider computing system, a billing service account switch request to the billing service computing system, the billing service account switch request initiating a switch of the billing service account from being linked to the third-party customer account to being linked to the customer account held by the provider.

3. The computer-implemented method of claim 2, wherein the selectable option is further configured to notify a third party that future payments from the customer to the third party should be pulled from the customer account held by the provider, and the computer-implemented method further comprises:

in response to receiving the selection of the selectable option, transmitting, by the provider computing system, a notification to the third party indicating that the future payments from the customer to the third party should be pulled from the customer account held by the provider.

4. The computer-implemented method of claim 3, further comprising identifying, by the provider computing system, a recurring payment from the third-party customer account to the third party, and wherein transmitting the notification to the third party is performed based on the recurring payment.

5. The computer-implemented method of claim 4, wherein identifying the recurring payment from the third-party customer account to the third party comprises:

transmitting, by the provider computing system, a financial data request to a financial data management computing system;

receiving, by the provider computing system, transaction data associated with the third-party customer account; and identifying, by the provider computing system, the recurring payment based on the transaction data associated with the third-party customer account.

6. The computer-implemented method of claim 3, further comprising:

generating, by the provider computing system, an account switch report including an indication of at least one of the transfer service token being successfully switched from being linked to the third-party customer account to being linked to the customer account held by the provider, the billing service account being successfully switched from being linked to the third-party customer account to being linked to the customer account held by the provider, or the third party being successfully notified that the future payments from the customer to the third party should be pulled from the customer account held by the provider; and transmitting, by the provider computing system, the account switch report to the customer device.

7. The computer-implemented method of claim 1, wherein the customer information comprises one of a phone number of the customer or an e-mail address of the customer, and wherein the transfer service query includes the one of the phone number or the e-mail address.

8. A provider computing system associated with a provider, the provider computing system comprising:

one or more processing circuits including one or more processors coupled to one or more memory devices, the one or more memory devices having instructions stored thereon that, when executed by the one or more processors, cause the one or more processors to:

receive a customer request from a customer device of a customer to perform an action associated with a new account to be opened or an existing account held by the provider, the customer request including customer information regarding the customer;

in response to receiving the customer request including the customer information:

transmit a transfer service query requesting transfer service information regarding the customer to a transfer service computing system, the transfer service query including the customer information of the customer and a query code, the query code configured to be recognized by the transfer service computing system as being part of the transfer service query instead of a transfer service request for a transfer of resources via a transfer service provided by the transfer service computing system, the query code configured to trigger an automatic search by the transfer service computing system for transfer service tokens of the customer based on the customer information;

receive a notification from the transfer service computing system indicating that a transfer service token of the customer is linked to a third-party customer account held by a third-party provider, the transfer service token comprising an identifier linked to the third-party customer account that is configured to enable transfers using the third-party customer account via the transfer service provided by the transfer service computing system;

in response to receiving the notification indicating that the transfer service token is linked to the third-party customer account from the transfer service computing system:

generate a graphical user interface including a selectable option, the selectable option, when selected by the customer, being configured to switch the transfer service token from being linked to the third-party customer account held by the third-party provider to being linked to a customer account held by the provider associated with the provider computing system; and transmit the graphical user interface to the customer device of the customer;

receive a selection of the selectable option via the graphical user interface from the customer device; and in response to receiving the selection of the selectable option, transmit a transfer service token switch request to the transfer service computing system, the transfer service token switch request initiating a switch of the transfer service token from being linked to the third-party customer account to being linked to the customer account held by the provider; and perform the action requested by the customer.

9. The provider computing system of claim 8, wherein the third-party customer account is further linked to a billing service account associated with a billing service computing system configured to facilitate an automatic bill payment from the customer to one or more third parties, the selectable option is further configured to switch the billing service account from being linked to the third-party customer account to being linked to the customer account held by the provider, and the instructions, when executed by the one or more processors, further cause the one or more processors to:

in response to receiving the selection of the selectable option, transmit a billing service account switch request to the billing service computing system, the billing service account switch request initiating a switch of the billing service account from being linked to the third-party customer account to being linked to the customer account held by the provider.

10. The provider computing system of claim 9, wherein the selectable option is further configured to notify a third party that future payments from the customer to the third party should be pulled from the customer account held by the provider, and the instructions, when executed by the one or more processors, further cause the one or more processors to:

in response to receiving the selection of the selectable option, transmit a notification to the third party indicating that the future payments from the customer to the third party should be pulled from the customer account held by the provider.

11. The provider computing system of claim 10, wherein the instructions, when executed by the one or more processors, further cause the one or more processors to identify a recurring payment from the third-party customer account to the third party, and wherein transmitting the notification to the third party is performed based on the recurring payment.

12. The provider computing system of claim 11, wherein identifying the recurring payment from the third-party customer account to the third party comprises:

transmitting a financial data request to a financial data management computing system;

receiving transaction data associated with the third-party customer account; and identifying the recurring payment based on the transaction data associated with the third-party customer account.

13. The provider computing system of claim 10, wherein the instructions, when executed by the one or more processors, further cause the one or more processors to:

generate an account switch report including an indication of at least one of the transfer service token being successfully switched from being linked to the third-party customer account to being linked to the customer account held by the provider, the billing service account being successfully switched from being linked to the third-party customer account to being linked to the customer account held by the provider, or the third party being successfully notified that the future payments from the customer to the third party should be pulled from the customer account held by the provider; and transmit the account switch report to the customer device.

14. The provider computing system of claim 8, wherein the customer information comprises one of a phone number of the customer or an e-mail address of the customer, and wherein the transfer service query includes the one of the phone number or the e-mail address.

15. A non-transitory computer-readable medium having instructions stored thereon that, when executed by at least one processing circuit of a provider computing system associated with a provider, cause operations comprising:

receiving, by a provider computing system associated with a provider, a customer request from a customer device of a customer to perform an action associated with a new account to be opened or an existing account held by the provider, the customer request including customer information regarding the customer;

in response to receiving the customer request including the customer information:

transmitting a transfer service query requesting transfer service information regarding the customer to a transfer service computing system, the transfer service query including the customer information of the customer and a query code, the query code configured to be recognized by the transfer service computing system as being part of the transfer service query instead of a transfer service request for a transfer of resources via a transfer service provided by the transfer service computing system, the query code configured to trigger an automatic search by the transfer service computing system for transfer service tokens of the customer based on the customer information;

receiving a notification from the transfer service computing system indicating that a transfer service token of the customer is linked to a third-party customer account held by a third-party provider, the transfer service token comprising an identifier linked to the third-party customer account that is configured to enable transfers using the third-party customer account via the transfer service provided by the transfer service computing system;

in response to receiving the notification indicating that the transfer service token is linked to the third-party customer account from the transfer service computing system:

generating a graphical user interface including a selectable option, the selectable option, when selected by the customer, being configured to switch the transfer service token from being linked to the third-party customer account held by the third-party provider to being linked to a customer account held by the provider associated with the provider computing system; and transmitting the graphical user interface to the customer device of the customer;

receiving a selection of the selectable option via the graphical user interface from the customer device; and in response to receiving the selection of the selectable option, transmitting a transfer service token switch request to the transfer service computing system, the transfer service token switch request initiating a switch of the transfer service token from being linked to the third-party customer account to being linked to the customer account held by the provider; and performing the action requested by the customer.

16. The non-transitory computer-readable medium of claim 15, wherein the third-party customer account is further linked to a billing service account of a billing service computing system configured to facilitate an automatic bill payment from the customer to one or more third parties, the selectable option is further configured to switch the billing service account from being linked to the third-party customer account to being linked to the customer account held by the provider, and the instructions, when executed by the at least one processing circuit, further cause operations comprising:

in response to receiving the selection of the selectable option, transmitting a billing service account switch request to the billing service computing system, the billing service account switch request initiating a switch of the billing service account from being linked to the third-party customer account to being linked to the customer account held by the provider.

17. The non-transitory computer-readable medium of claim 16, wherein the selectable option is further configured to notify a third party that future payments from the customer to the third party should be pulled from the customer account held by the provider, and the instructions, when executed by the at least one processing circuit, further cause operations comprising:

in response to receiving the selection of the selectable option, transmitting a notification to the third party indicating that the future payments from the customer to the third party should be pulled from the customer account held by the provider.

18. The non-transitory computer-readable medium of claim 17, wherein the instructions, when executed by the at least one processing circuit, further cause operations comprising identifying a recurring payment from the third-party customer account to the third party, and wherein transmitting the notification to the third party is performed based on the recurring payment.

19. The non-transitory computer-readable medium of claim 18, wherein identifying the recurring payment from the third-party customer account to the third party comprises:

transmitting a financial data request to a financial data management computing system;

receiving transaction data associated with the third-party customer account; and identifying the recurring payment based on the transaction data associated with the third-party customer account.

20. The non-transitory computer-readable medium of claim 15, wherein the selectable option, when selected by the customer, is configured to switch the transfer service token from being linked to the third-party customer account held by the third-party provider to being linked to a customer account held by the provider associated with the provider computing system without additional input from the customer.

* * * * *